United States Patent
Lemberger et al.

(10) Patent No.: US 11,115,629 B1
(45) Date of Patent: Sep. 7, 2021

(54) CONFIRMING PACKAGE DELIVERY USING AUDIO/VIDEO RECORDING AND COMMUNICATION DEVICES

(71) Applicant: Amazon Technologies, Inc., Seattle, WA (US)

(72) Inventors: Elliott Lemberger, Santa Monica, CA (US); John Modestine, Los Angeles, CA (US); Joshua Roth, Pacific Palisades, CA (US); Micah Stone, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/175,121

(22) Filed: Oct. 30, 2018

(51) Int. Cl.
| | | |
|---|---|---|
| *H04N 7/18* | (2006.01) | |
| *G06Q 10/08* | (2012.01) | |
| *H04L 29/06* | (2006.01) | |
| *G10L 13/00* | (2006.01) | |

(52) U.S. Cl.
CPC ......... *H04N 7/186* (2013.01); *G06Q 10/0832* (2013.01); *G06Q 10/0833* (2013.01); *G10L 13/00* (2013.01); *H04L 63/0884* (2013.01)

(58) Field of Classification Search
CPC ...... G06K 9/00335; G06T 2207/30232; H04N 7/186; G10L 13/00
See application file for complete search history.

(56) References Cited

U.S. PATENT DOCUMENTS

| | | | |
|---|---|---|---|
| 9,172,922 B1* | 10/2015 | Kasmir | H04N 7/186 |
| 10,074,224 B2* | 9/2018 | Ho | G07C 9/00079 |
| 10,255,737 B1* | 4/2019 | Eichenblatt | G06Q 10/083 |
| 10,360,746 B1* | 7/2019 | Giles | G08B 25/008 |
| 2003/0195814 A1* | 10/2003 | Striemer | G06Q 30/02 705/26.8 |
| 2010/0274728 A1* | 10/2010 | Kugelman | G06Q 10/00 705/80 |
| 2015/0145643 A1* | 5/2015 | Fadell | G06Q 10/083 340/5.51 |
| 2015/0161563 A1* | 6/2015 | Mehrabi | G06Q 10/08355 705/338 |
| 2016/0247027 A1* | 8/2016 | Tsoi | H04L 67/125 |
| 2017/0323259 A1* | 11/2017 | Gillen | G06Q 10/0833 |
| 2018/0247253 A1* | 8/2018 | Duquene | G06F 21/604 |

(Continued)

*Primary Examiner* — Jefferey F Harold
*Assistant Examiner* — Timothy R Newlin
(74) *Attorney, Agent, or Firm* — Greenberg Traurig, LLP

(57) ABSTRACT

A method for remotely confirming delivery of a package may be accomplished using a client device and a using a network-connectable audio/video (A/V) recording and communication device. The method includes initiating the two-way communication between the client device and the A/V recording and communication device. The method further includes receiving, via a user interface of the client device, an indication that a package is being delivered to a building associated with the A/V recording and communication device. The method further includes receiving, at the client device, information about the package and displaying, on a display of the client device, the information about the package. The method further includes receiving, via the user interface, an electronic signature indicating acceptance of delivery of the package. The method further includes transmitting, by the client device, the electronic signature to a delivery service server.

21 Claims, 13 Drawing Sheets

(56) References Cited

U.S. PATENT DOCUMENTS

2018/0290764 A1* 10/2018 McMillian ............ G08G 5/0026
2019/0050805 A1* 2/2019 Munafo ............. G06Q 10/0833
2019/0231106 A1* 8/2019 Kaiserman .............. F25D 13/04
2019/0258264 A1* 8/2019 Bash ...................... G05D 1/102

* cited by examiner

CONFIRMING PACKAGE DELIVERY USING AUDIO/VIDEO RECORDING AND COMMUNICATION DEVICES

BACKGROUND

Home security is a concern for many homeowners and renters. Those seeking to protect or monitor their homes often wish to have video and audio communications with visitors, for example, those visiting an external door or entryway. Audio/video (A/V) recording and communication devices ("A/V devices"), such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present confirming package delivery using audio/video recording and communication devices now will be discussed in detail with an emphasis on highlighting the advantageous features. These embodiments depict the novel and non-obvious confirming package delivery using audio/video recording and communication devices shown in the accompanying drawings, which are for illustrative purposes only. These drawings include the following figures, in which like numerals indicate like parts.

DETAILED DESCRIPTION

Figure 1:
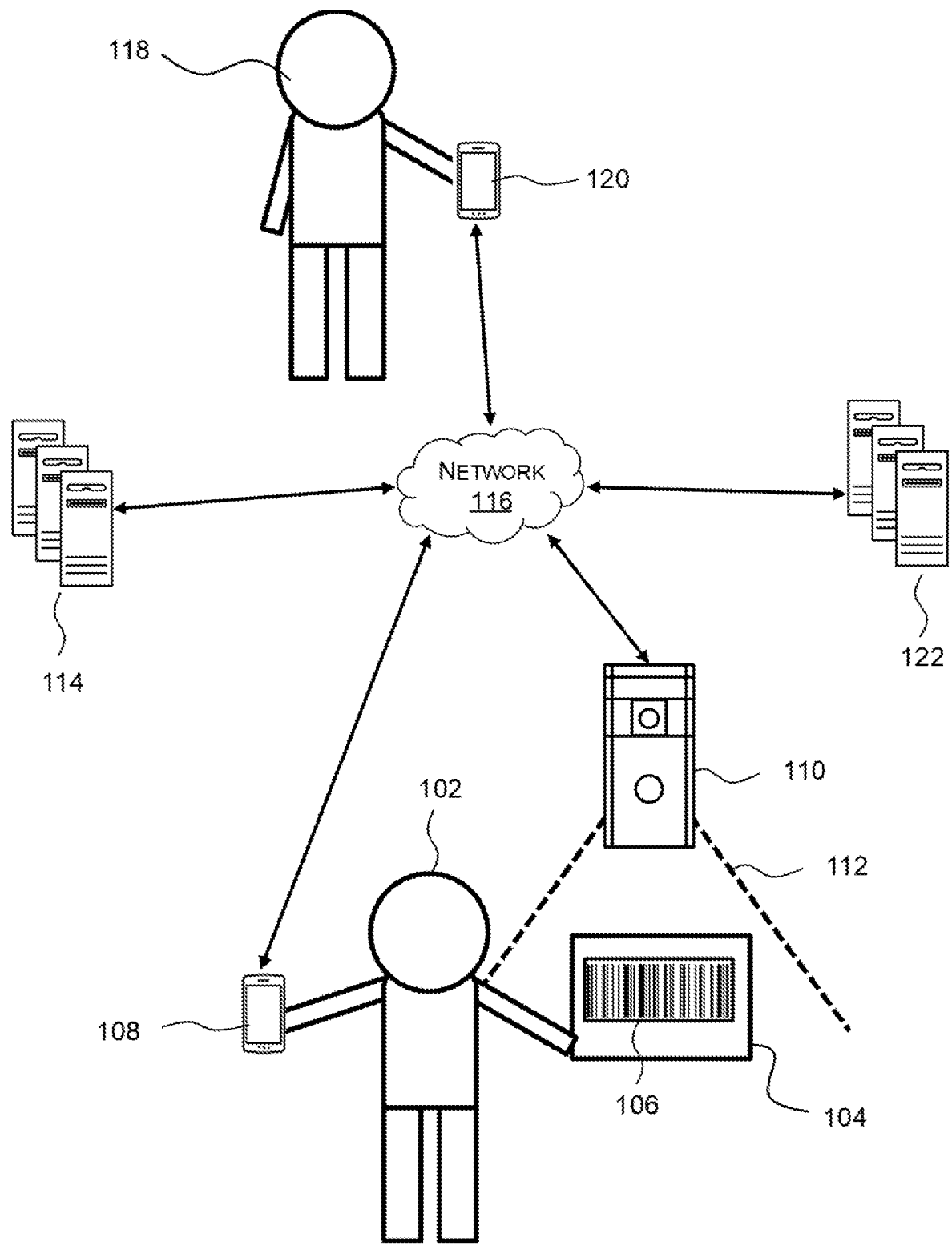
FIG. 1 is a schematic diagram of an example of confirming package delivery using an audio/video (A/V) recording and communication device ("A/V device"), according to various aspects of the present disclosure.

One aspect of the present embodiments includes the realization that some packages (which may also be referred to herein as parcels) cannot be left at the delivery address unless someone at the delivery address provides a signature to verify the safe receipt of the package at the delivery address. Sometimes, however, packages are delivered when neither the recipient of the package, nor another person authorized to accept delivery of the package, is available to sign for the package. When a delivery person cannot obtain a signature for a package that requires a signature, the delivery person must retain possession of the package. For example, the delivery person may take the package back to a distribution location, and may again attempt delivery at some future date. This process reduces the efficiency of the package delivery process, which in turn raises costs for the parcel carrier, which costs may be passed on to the consumer. In another example, after the package is returned to the distribution location, the recipient may be required to pick up the package from the distribution location, which can be inconvenient for the recipient.

The present embodiments solve these problems by leveraging the functionality of audio/video (A/V) recording and communication devices, such as A/V doorbells, to enable a user to remotely confirm package delivery, such as by providing a signature even when the user is not at home at the time the package is delivered. For example, a parcel delivery person may use the A/V recording and communication device ("A/V device") to communicate with a client device (may also be referred to as a user computing device) of the intended recipient of the package, to thereby send a request for confirmation to deliver the package. Once the user of the client device determines the user wants to accept and confirm the delivery of the package, the user may communicate that intent to the delivery person at the delivery location, such as by providing a signature through the client device. The A/V device at the delivery location may request information about the delivery from a remote server. The remote server may in turn request (and receive) the delivery information from another remote server, and may then transmit the delivery information to the client device for confirmation. The client device, via a user interface, may receive confirmation—for example, a signature—from the user, and may cause transmission of the confirmation to an electronic device of the parcel delivery carrier, thereby confirming the delivery of the package. The delivery person (e.g., carrier) may then leave the package at the delivery location based on the confirmation received from the user via the client device.

In some embodiments, the user at the client device may be provided the option to initiate a delivery confirmation procedure, such as by selecting a command from within an application executing on the client device. In such embodiments, the user may initiate the delivery confirmation procedure on the client device based on the request from the A/V device, and via the application on the client device. The user at the client device may cause the client device to transmit a signal to the remote server requesting information related to the delivery of the package. The user at the client device may also provide audio instructions to be emitted through the speaker of the A/V device, where the audio instructions may be a statement instructing the parcel carrier to provide identification information of the package by holding the package in front of the camera of the A/V device. In one embodiment, the statement may instruct the parcel carrier to input the information via a user interface at the A/V device, or to cause such information to be sent to the A/V device. In some embodiments, the instructions may be displayed to the parcel carrier on a visual display of the A/V device.

In some embodiments, the request for confirmation may be transmitted to a remote server to cause delivery information regarding the package to be transmitted to the client device from the remote server. In one example, the confirmation request may include identification information, such as a unique identification code associated with the package. The backend server may then perform a lookup function, for example by communicating the unique identification code to the server(s) of the delivery company, and thereby retrieve delivery information associated with the package. The backend server may then cause the delivery information to be transmitted to the client device for review by the user.

At least in part because the A/V device is able to communicate identification information of the package to the remote server and cause the client device to receive delivery information regarding the package, the user does not have to be physically present at the delivery location. The present embodiments thus create greater efficiency in the delivery process, which leads to lower delivery costs for parcel carriers and lower prices for consumers of delivery services. Various embodiments also create convenience for users by enabling package recipients to receive packages remotely, even when those packages require a signature for delivery. Various embodiments may also reduce loss events, as a recipient can instruct a delivery person on a safer location to leave a package, such as placing a package behind a fence/gate, hiding the package in a particular location, etc.

The various embodiments of the present confirming package delivery using audio/video recording and communication devices have several features, no single one of which is solely responsible for their desirable attributes. Without limiting the scope of the present embodiments as expressed by the claims that follow, the remaining detailed description describes the present embodiments with reference to the drawings. In the drawings, reference numbers label elements of the present embodiments. These reference numbers are reproduced below in connection with the discussion of the corresponding drawing features. After considering this discussion, one will understand how the features of the present embodiments provide the advantages described herein.

FIG. 1 is a schematic diagram of an example of confirming package delivery using an audio/video recording and communication device, according to various aspects of the present disclosure. FIG. 1 includes a delivery person 102 holding a package 104. The package 104 may include thereon a barcode 106. The barcode 106 may encode a unique identifier associated with the package 104. The unique identifier may be associated with various information about the package, such as the contents of the package 104, information about a sender of the package 104, a return address associated with the package 104, a delivery address for the package 104, information about a delivery service that is delivering the package 104 (for whom the delivery person 102 may also work), whether delivery confirmation (may also be referred to herein as acceptance of delivery) is required for the package 104, postage paid to deliver the package 104, a type of shipping (e.g., express, standard, air, ground, one-day, two-day, first class, etc.) assigned to the package 104, routing information for delivery of the package 104, current location information of the package 104, information about when and/or where the package 104 was scanned, weight of the package 104, a description of contents of the package 104, a tracking number associated with the package 104, an identity of a delivery service delivering the package 104, or an identity of a delivery person delivering the package 104, other information about the package 104, or any combination thereof.

The barcode 106 is an example of a machine-readable optical code. Although a barcode is shown in FIG. 1, any other kind of code that may be used to encode a unique identifier may be used. For example, different machine-readable optical codes that may be used may be a QR code, a bokode, or a code made up of alphanumeric characters that can be read using optical character recognition (OCR). The code may also be a non-optical machine-readable code, such as a radio frequency identification (RFID) device or other electronically readable code that electronically encodes a unique identifier associated with the package. Other wireless communication methods may be used instead of or in addition to RFID, such as Bluetooth Low Energy (BLE), Zigbee, Z-Wave, Wi-Fi, etc.

The delivery driver 102 in the example of FIG. 1 is delivering the package 104 to a delivery address where an audio/video (A/V) recording and communication device ("A/V device") is installed. In particular, the A/V device in FIG. 1 is a video doorbell 110. However, the A/V device need not be a doorbell and could simply be a video/surveillance/security camera or the like, and references to a doorbell herein are intended to be illustrative and not limiting. The delivery person 102 may press a button of the video doorbell 110 when the delivery person 102 arrives at the location to deliver the package 104 or, if the A/V device is not a doorbell, it may activate upon the detection of motion. Alternatively, or in addition, regardless of whether the A/V device is a doorbell or not, the A/V device may detect the approach of the package 104 through wireless signals communicated between the A/V device and an RFID (or similar) tag or chip on or within the package 104, as described below.

As described herein, problems can arise in a package delivery process if delivery confirmation (e.g., a signature) is required to leave the package at the location, but no one is present to receive the package. By pressing the button on the video doorbell 110, a two-way audio and/or video communication may be initiated between the video doorbell 110 and a client device 120. The client device 120 may be, for example, a smartphone. The client device 120 may be in the possession of a user 118 who is not present at the location of the video doorbell 110. For example, the user 118 may live in a house where the video doorbell 110 is located, but the user 118 is at work when the delivery person 102 is attempting to deliver the package 104.

During the two-way audio and/or video communication, the video doorbell 110 captures audio using a microphone and video using a camera. This audio and/or video is transmitted to the client device 120 through a network 116. Accordingly, the user 118 and the client device 120 may be physically remote from the video doorbell 110, but the user 118 and the delivery person 102 may still communicate with one another. The user 118 can therefore see the delivery person 102 on the display of the client device 120 and hear the delivery person 102 through a speaker of the client device 120. Similarly, the client device 120 can capture audio through a microphone and transmit that audio to the video doorbell 110 to be emitted through a speaker of the video doorbell 110. In the example of FIG. 1, the video doorbell 110 is not equipped with a display for receiving and displaying video of the user 118 from the client device 120. However, in other embodiments, the video doorbell 110 may include a display so that both audio and video may be captured, transmitted, and received by both the client device 120 and the video doorbell 110.

The two-way communication may be facilitated by a server 114. The server 114 may be associated with the video doorbell 110 and the client device 120 for providing two-way communication services between the two devices. For example, the user 118 may be able to see other persons or objects other than delivery persons and packages that are in a field of view 112 of the video doorbell 110 using the service facilitated by the server 114. Accordingly, any communications, messages, transmissions, etc. between the client device 120 and the video doorbell 110 (and between any other devices shown or described herein) may be routed through the server 114. For example, video data captured by the video doorbell 110 may be transmitted from the video doorbell 110 to the server 114 through the network 116, then transmitted from the server 114 to the client device 120 through the network. Other data may be similarly transmitted between any of the devices shown in FIG. 1 through the server 114 and the network 116.

During the two-way communication, the delivery person 102 communicates to the user 118 that the delivery person has the package 104 for delivery. The user 118 may then make an input into a user interface of the client device 120 indicating that a package is being delivered. The address where the package 104 is supposed to be delivered may be a building with which the video doorbell 110 is associated (e.g., the video doorbell 110 is attached to the building). The input into the user interface of the client device 120 may occur, for example, through pushing a button that is displayed on a touch screen of the client device 120. In another example, the user may input to the client device 120 an indication that a package is being delivered using a voice command. The indication that a package is being delivered initiates a process for remotely confirming package delivery, since the user 118 and the client device 120 are not actually present at the location where the package 104 is being delivered by the delivery person 102. For example, the indication that a package is being delivered may cause the client device 120 to transmit a first message to the server 114 instructing the server 114 to initiate the process for remotely confirming package delivery (or otherwise indicating that package is being delivered). The server 114 may then transmit a second message to the video doorbell 110 causing the video doorbell 110 to initiate a process for capturing the barcode 106 (or other unique identifier) of the package 104 so that the unique identifier associated with the package 104 can be identified.

In one example, the second message that causes the video doorbell 110 to initiate a process for capturing the barcode 106 causes the video doorbell 110 to use an image analysis process on image/video data captured by the camera of the video doorbell to recognize the barcode 106. In other embodiments, other visual codes than a barcode may be used, and the video doorbell 110 may, in those embodiments, use an image analysis process to recognize a different visual code. For example, the image/video data may be analyzed to recognize patterns that indicate a barcode or other visual code (e.g., QR code, bokode, etc.) are present. The user 118 may instruct the delivery person 102 to present the barcode 106 of the package 104 to the video doorbell 110 so that the barcode 106 is within the field of view 112 of the camera of the video doorbell 110. When the video doorbell 110 recognizes that a visual code (e.g., the barcode 106) is present in the field of view, the video doorbell 110 may capture that image and send the image to the server 114 for analysis to determine the unique identifier of the package. In various embodiments, the determination of the unique identifier from the image that includes the visual code may happen at other devices instead of or in addition to the server 114. For example, the unique identifier may be determined by the video doorbell 110, and the video doorbell 110 may transmit the unique identifier to the server 114 and/or the client device 120, and may not transmit the image captured with the visual code. In another example, the image with the visual code may be processed by the client device 120 to determine the unique identifier.

In various embodiments, the video doorbell 110 may not have an automated process for determining that a visual code is within the field of view 112 of the camera of the video doorbell 110. In such embodiments, another device such as the client device 120 or the server 114 may perform the analysis of image/video data from the video doorbell 110 to determine when the barcode 106 is being presented. The other devices, such as the client device 120 or the server 114, can then use that video data to determine the unique identifier associated with the package. In another example, the user 118 or delivery person 102 may indicate that the barcode 106 (or other visual code) is being presented to the video doorbell 110. For example, the delivery person 102 may press a button on the video doorbell 110 after the two-way communication has begun to indicate that the visual code is being presented in the field of view 112 of the video doorbell. In another example, the user 118 watching the video being captured by the video doorbell 110 will see that the visual code is being presented. The user 118 may then make an input through the user interface of the client device 120 (e.g., pressing a button displayed on a touch-screen of the client device 120) to indicate that the visual code is being presented.

Once the unique identifier of the package 104 is determined, information about the package 104 is retrieved. In the example of FIG. 1, the unique identifier associated with the package 104 is received at or otherwise determined by the server 114. The server 114 then transmits the unique identifier to a delivery service server 122 via the network 116. The delivery service server 122 is a server associated with the delivery service that is tasked with delivering the package 104, and may employ the delivery person 102. The delivery service server 122 may have stored thereon information about the package 104 that is associated with the unique identifier. Accordingly, the delivery service server 122 may transmit the information about the package 104 to the server 114 in response to receiving the unique identifier from the server 114. In various embodiments, the server 114 and the delivery service server 122 may be the same server, such that the server retrieves or looks up the information about the package 104 itself, or the server 114 and the delivery service server 122 may be more than two servers as depicted in FIG. 1. The information about the package 104 is then transmitted to the client device 120. The client device 120 displays the information about the package 104 so that the user 118 can verify the details relating to the package 104. For example, the information may include a delivery address of the package 104, and the user 118 can confirm that the address is correct. For example, the user 118 may press a button displayed on a touchscreen user interface of the client device 120 to confirm that the package 104 should be delivered to the location where the video doorbell 110.

The confirmation of the information relating to the package 104 may serve as delivery confirmation for the package. In various embodiments, additional or different delivery confirmation may be used. For example, the user 118 may also electronically sign for the package 104 by inputting an electronic signature through a user interface of the client device 120. The electronic signature and/or a message indicating that delivery has been accepted/confirmed may then be sent from the client device 120 to one or both of the server 114 and the delivery service server 122. For example, the delivery service server 122 may receive the electronic signature and/or message indicating that delivery has been accepted/confirmed via the network 116 from the server 114, which received the electronic signature and/or message indicating that delivery has been accepted/confirmed via the network 116 from the client device 120. The delivery service server 122 may then transmit a message to a delivery person client device 108 that the delivery confirmation/acceptance has been received. This message indicating that the delivery confirmation/acceptance has been received may instruct the delivery person to leave the package 104 at the delivery address (e.g., a building where the video doorbell 110 is installed).

The two-way communication between the video doorbell 110 and the client device 120 provides additional benefits for the delivery service and delivery person 102, and the user 118. During the two-way communication, the user 118 can instruct the delivery person 102 on where to leave the package 104. For example, the user 118 may instruct the delivery person 102 to hide the package 104 behind some vegetation (e.g., a bush, shrub, tree, etc.), place the package 104 behind a fence/gate, leave the package 104 on a patio and/or inside a storm/screen door, put the package 104 in the back yard, or any other instruction. This aspect allows the user 118 to have the package left in a location that may be safer and/or less obvious than a more conspicuous location such as on a front porch or by a door.

In various embodiments, if the package 104 includes (e.g., contains) an RFID (or similar) tag or chip, and the A/V device 110 includes components for detecting and receiving signals from such a tag or chip, then a process for receiving the package 104 may begin before the delivery person 102 reaches the A/V device 110. For example, as the delivery person 102 approaches the A/V device 110, a motion sensor (e.g., a passive infrared sensor) and/or a camera of the A/V device 110 may detect motion. In response, the A/V device 110 may activate one or more components for detecting and receiving signals from the tag or chip on or within the package 104. For example, the package 104 may include a passive RFID tag, and the A/V device 110 may include a sine wave generator or other componentry for activating/exciting the passive RFID tag. The A/V device 110 may then receive a wireless signal from the passive RFID tag including a unique identifier associated with the package 104. The A/V device 110 may then transmit information received from the passive RFID tag, such as the unique identifier associated with the package 104, to the server 114, the network 116, and/or the delivery service server 122. The process for delivering/receiving the package 104, providing confirmation of delivery, providing an electronic signature for the package 104, etc. may then proceed substantially as described above. In another example, the sine wave generator or other componentry for activating/exciting the passive RFID tag may be activated independently of any motion detection. For example, the sine wave generator or other componentry may continuously scan for RFID tags within communication range, or may periodically wake up and scan for RFID tags within communication range.

Figure 2:
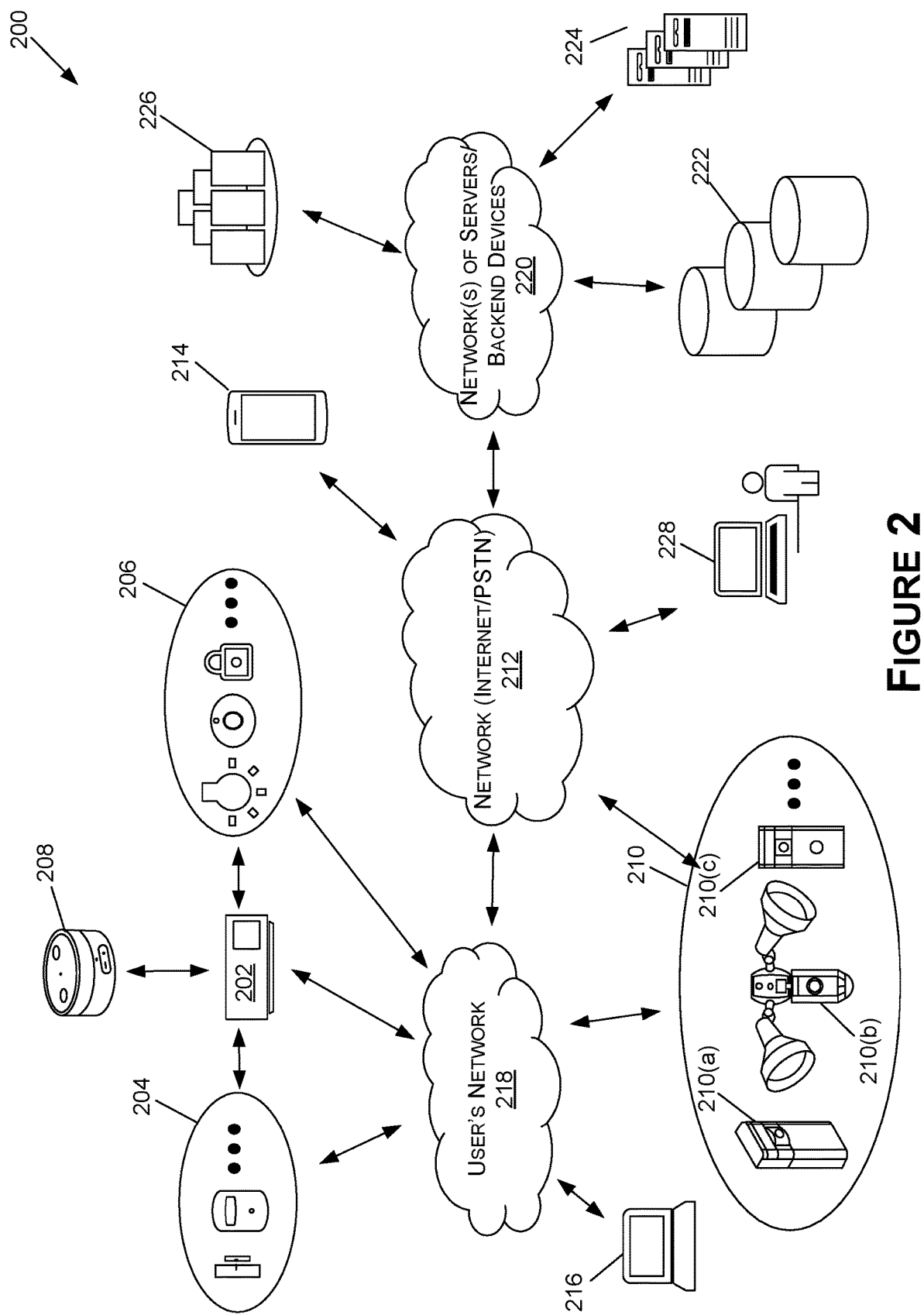
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices ("A/V devices") 210, etc.), when remotely monitored and controlled via a network (Internet/a public switched telephone network (PSTN)) 212 (which may be similar to, and represent the network 112), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, RFID and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (the video doorbell 110 is an example of an A/V device, and therefore may represent, and/or be similar to, the A/V devices 210 described herein). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., RFID, BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212. The network 116 of FIG. 1 may include similar components and/or functionality as the network 212, the user's network 218, and/or the network of servers/backend devices 220.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client devices 108 and/or 120 of FIG. 1). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes. The server 114 and/or the delivery service server 122 of FIG. 1 may alone or together include similar components and/or functionality as the network of servers/backend devices 220, the backend server 224, the storage device 222, and/or the backend API 226.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The server 114 and/or the delivery service server 122 of FIG. 1 may alone or together include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
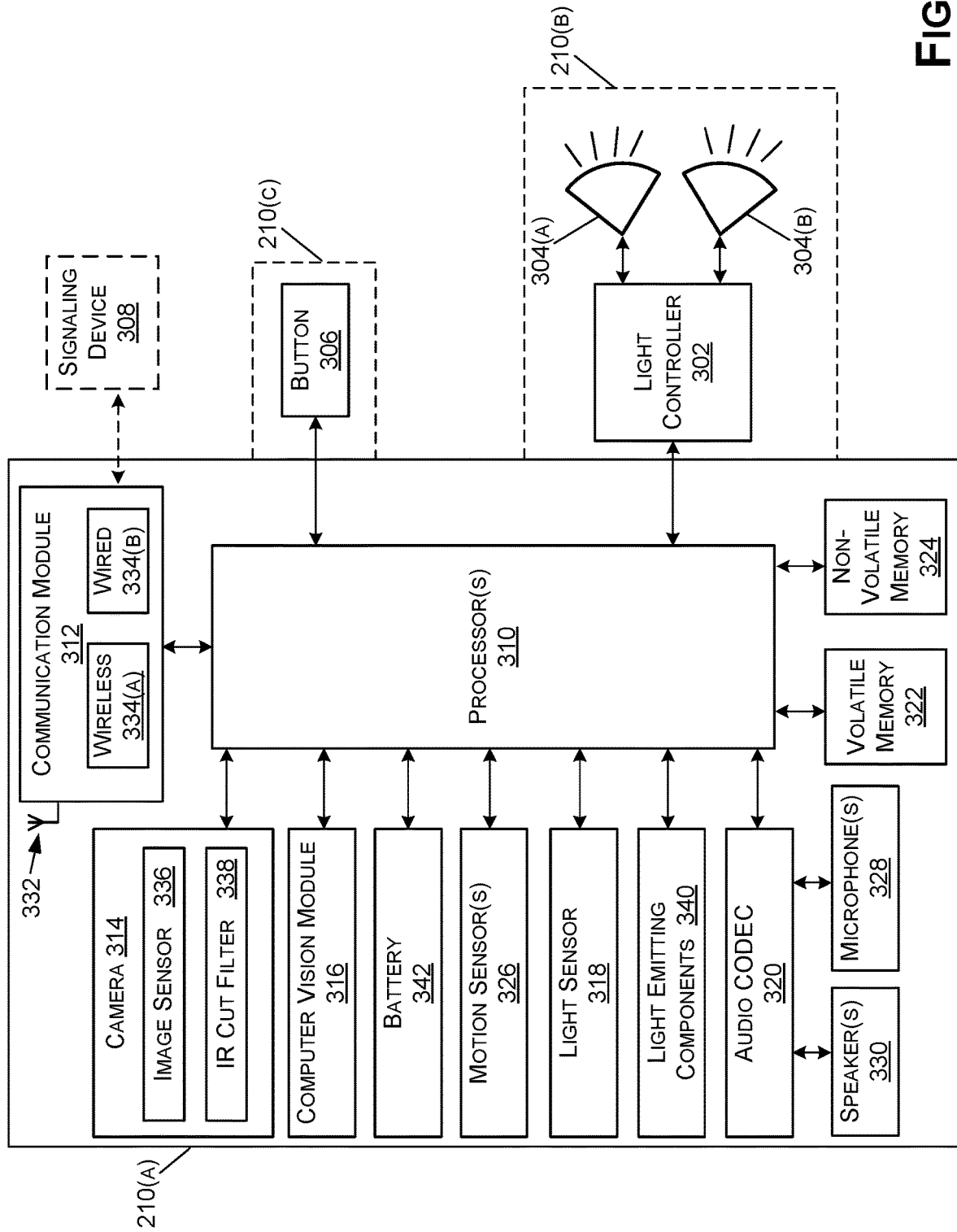
FIG. 3 is a functional block diagram of an A/V device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, RFID, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the A/V recording and communication device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
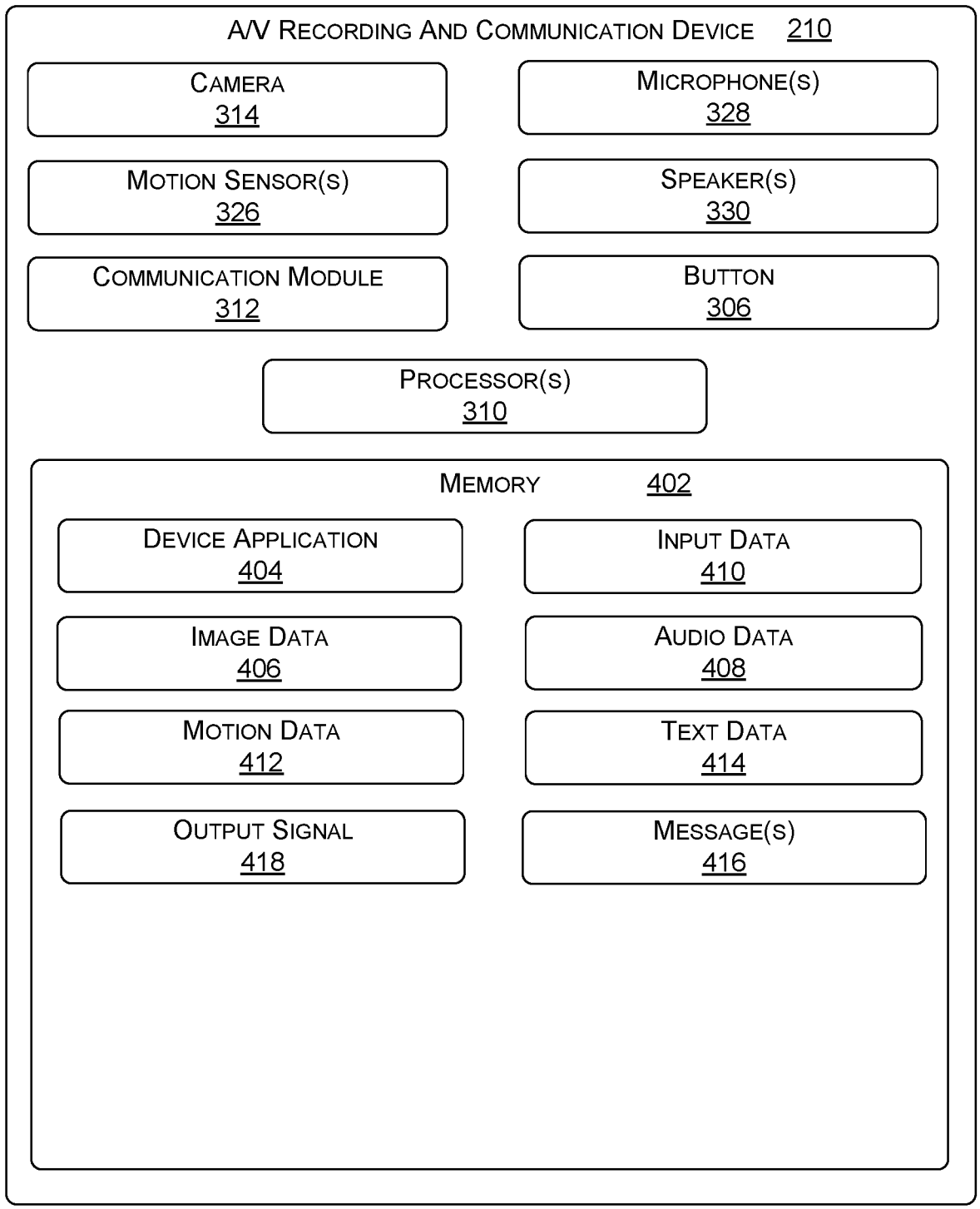
FIG. 4 is a functional block diagram illustrating one example embodiment of an A/V device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V doorbell 210(c), the A/V security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210. The device application 404 may, in various embodiments, also configure the processor(s) 310 to perform other methods, processes, steps, etc. as described herein, including for confirming package delivery.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210. As described herein, A/V devices such as the A/V device 210 may be used in various embodiments for confirming package delivery.

Figure 5:
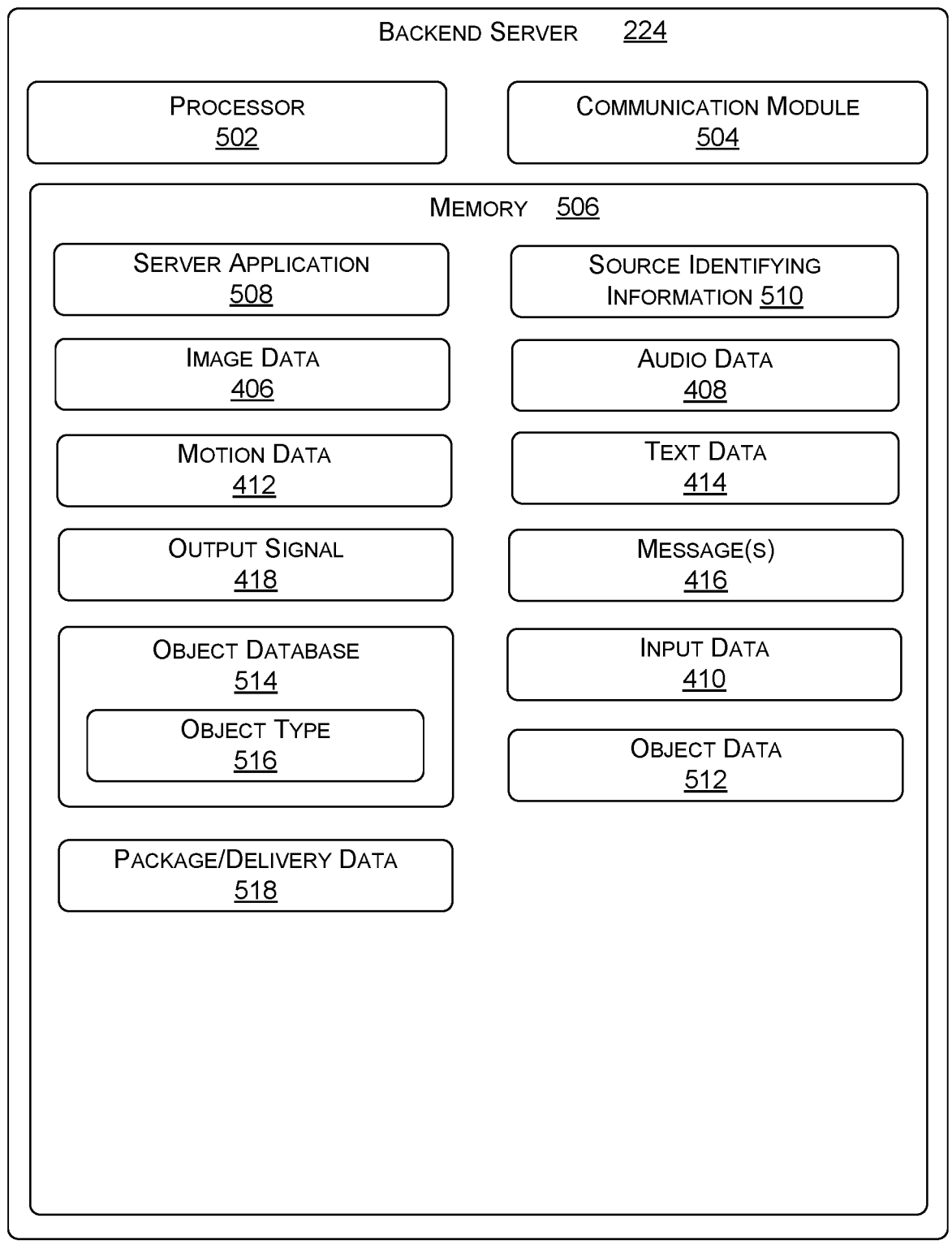
FIG. 5 is a functional block diagram illustrating one example embodiment of a backend device according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, a device controlled by the security monitoring service 228, the A/V devices 210, and/or the client devices 232).

The memory 506 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, the motion data 412, and/or package/delivery data 518 to the client devices 214, 216 using the communication module 504. Furthermore, the server application 508 may configure the processor(s) 502 to receive, using the communication module 504, image data (also referred to as "second image data") generated by the A/V devices 210. The server application 508 may, in various embodiments, also configured the processor(s) 502 to perform other methods, processes, steps, etc. as described herein, including for confirming package delivery.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224. As described herein, servers such as the backend server 224 may be used in various embodiments for confirming package delivery.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

The memory 506 may also have stored thereon package/delivery data 518. The package delivery data 518 may include information about packages being delivered as described herein. Information about packages may include information such as contents of a package, information about a sender of a package, a return address associated with a package, a delivery address for a package, information about a delivery service that is delivering a package (for whom a delivery person may work), whether delivery confirmation (may also be referred to herein as acceptance of delivery) is required for a package, postage paid to deliver a package, a type of shipping (e.g., express, standard, air, ground, one-day, two-day, first class, etc.) assigned to a package, routing information for delivery of a package, current location information of a package, information about when and/or where a package was scanned, weight of a package, a description of contents of the package, a tracking number associated with the package, an identity of a delivery service delivering the package, or an identity of a delivery person delivering the package, other information about a package, or any combination thereof. The package/delivery data 518 may be sent to the client device 214, 216, the A/V device 210, or any other device in order to facilitate confirmation of package delivery as described herein. In various embodiments, some or all of the package/delivery data 518 may be stored on the client device 214, 216, the A/V device 210, or any other device in addition to or instead of being stored on the backend server 224.

Although described as being performed in the backend server 224, in some embodiments, the image data 406 may be analyzed by any of the A/V device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the backend server 224 (and/or one or more additional or alternative components of the network(s) of servers/backend devices 220) may alternatively be referred to herein as "network devices."

Figure 6:
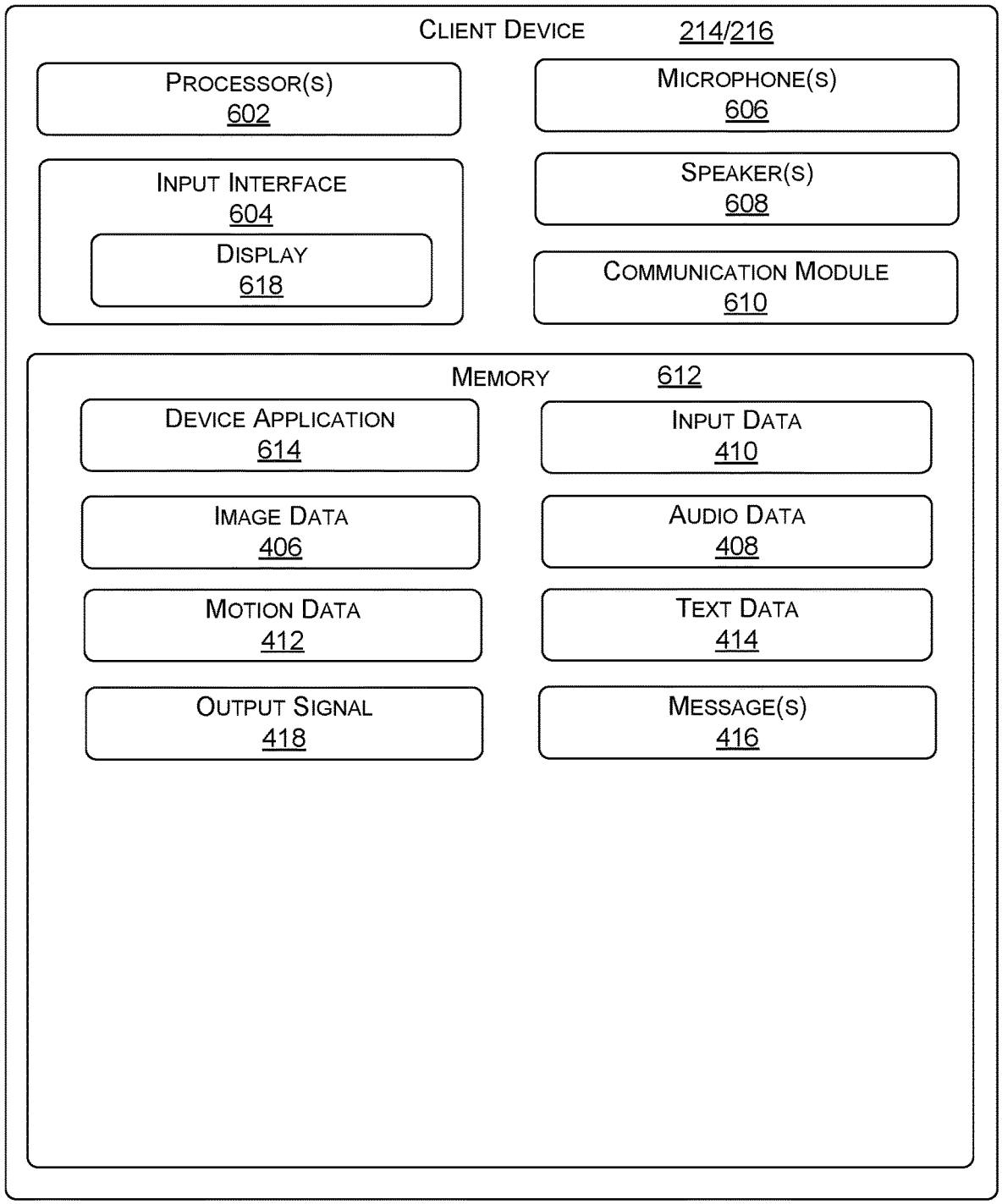
FIG. 6 is a functional block diagram illustrating one example embodiment of a client device according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., receive an indication that a package is being delivered, receive an acceptance/confirmation of delivery of a package such as an electronic signature, receive a confirmation of the information about a package, receive a voice command or voice passcode, receive an input instructing the client device 214, 216 and/or the A/V device 210 to capture an image including a scannable code). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224. The device application 614 may, in various embodiments, also configure the processor(s) 602 to perform other methods, processes, steps, etc. as described herein, including for confirming package delivery.

With further reference to FIG. 6, the input interface 604 may include a display 618. The display 618 may include a touchscreen, such that the user of the client device 214, 216 may provide inputs directly to the display 618 (e.g., receive an indication that a package is being delivered, receive an acceptance/confirmation of delivery of a package such as an electronic signature, receive a confirmation of the information about a package, receive a voice command or voice passcode, receive an input instructing the client device 214, 216 and/or the A/V device 210 to capture an image including a scannable code). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, a microphone, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216. As described herein, client devices such as the client device 214, 216 may be used in various embodiments for confirming package delivery.

Various processes will now be described, with respect to FIGS. 7-9, for confirming package delivery using audio/video recording and communication devices. Each of the processes described herein, including the process 700, are illustrated as a collection of blocks in a logical flow graph, which represent a sequence of operations that may be implemented in hardware, software, or a combination thereof. Similarly, the signal processes 800 and 900 described herein may also be implemented in hardware, software, or a combination thereof. In the context of software, the blocks and/or signals represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks and/or signals may be combined in any order and/or in parallel to implement the processes. Additionally, any number of the described blocks and/or signals may be optional and eliminated to implement the processes.

Figure 7:
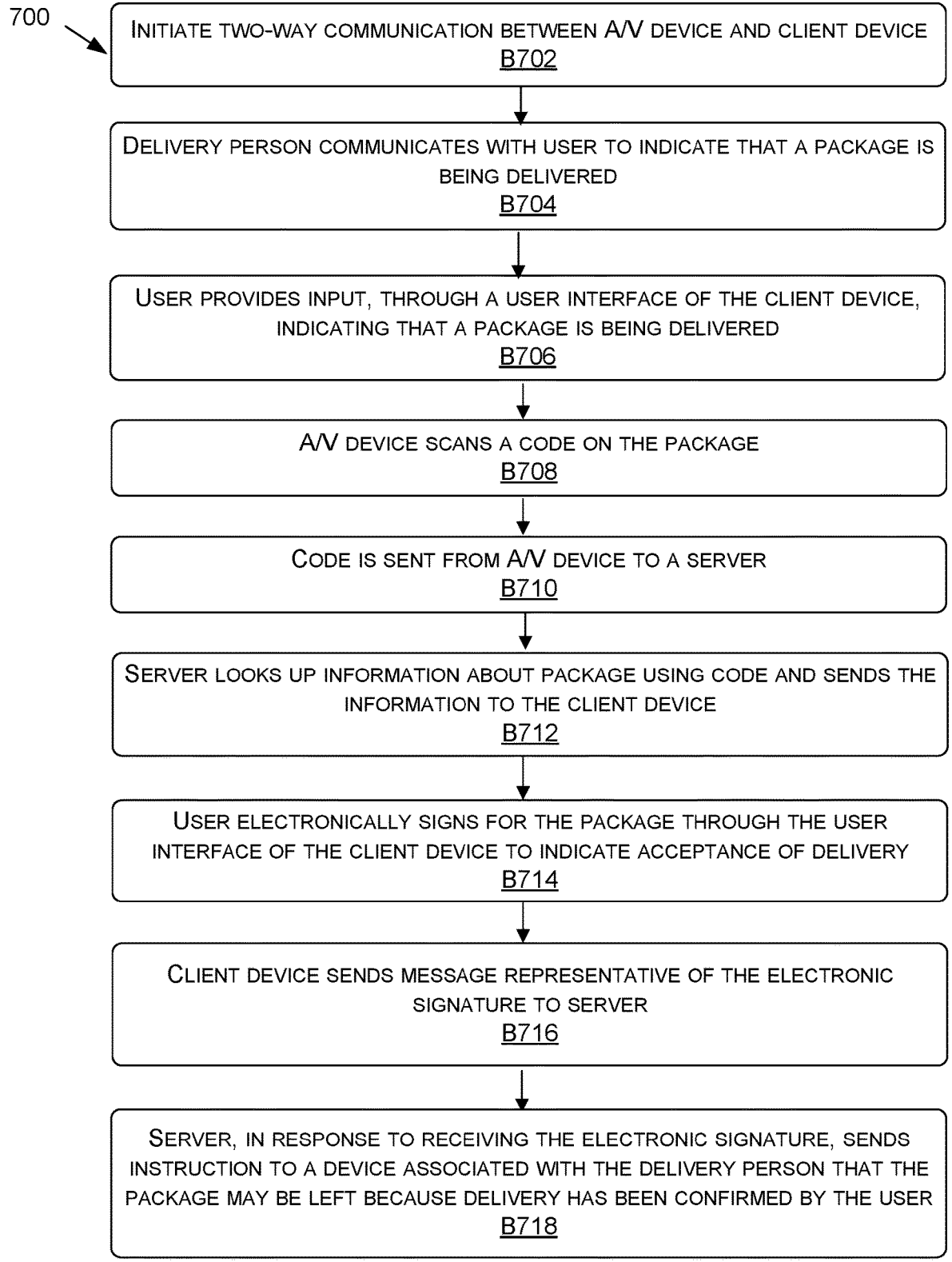
FIG. 7 is a flowchart illustrating an example process for confirming package delivery according to various aspects of the present disclosure.

FIG. 7 is a flowchart illustrating an example process 700 for confirming package delivery, according to various aspects of the present disclosure. At block B702, a two-way communication is initiated between an A/V device and a client device. The A/V device may be, for example, the A/V device 210 (FIG. 3) as described herein and/or the video doorbell 110 shown in FIG. 1. The client device may be, for example, the client device 214, 216 (FIG. 6) as described herein and/or the client device 120 of FIG. 1. The two-way communication is considered to be initiated by or at both of the A/V device and the client device. The two-way communication is initiated at both ends of the communication (the A/V device and the client device) because each device must begin or execute some sort of process to allow for the two-way communication to occur. For example, the two-way communication may include audio data being captured by a microphone of each of the A/V device and the client device, transmitting the respective audio data captured at each device, and each device causing the audio data received from the other device to be output on a speaker. Accordingly, both devices have a role in the two-way communication, so both devices are considered to have a part in initiating any two-way communication. Similarly, one or both of the devices may capture video and/or image data that can be transmitted and/or output as part of the two-way communication. In various embodiments, a server or other network device may be used to facilitate a two-way communication. Accordingly, such a server may be considered to connect the two-way communication in various embodiments. Such a server or network device may be, for example, the backend server 224 (FIG. 5) as described herein, the server 114 of FIG. 1, and/or the delivery service server 122 of FIG. 1.

At block B704, a delivery person delivering a package communicates with a user to indicate that a package is being delivered. In particular, the delivery person may speak to the user through the two-way communication between the A/V device and the client device. The A/V device may be installed at a building where the delivery person is delivering the package. The user and/or the client device of the user is associated with the building and/or the A/V device, such that two-way communication is properly initiated with and by the correct client device. In various embodiments, the delivery person and the user may communicate in other or additional ways beyond speaking to one another. For example, one or both of them may be able to see video of the other person. In another example, the system may transcribe audio of one or both of the parties speaking using a voice-to-text process. The text may then be displayed on the A/V device and/or the client device. In another example, the delivery person and/or the user may input (e.g., type on a keyboard) text that can be displayed on the other party's device.

At block B706, the user provides input through a user interface of the client device that indicates that a package is being delivered. For example, a touchscreen of the client device may have a button displayed thereon which, during the two-way communication, can be pressed to indicate that a package is being delivered. This input can initiate a delivery confirmation process as described herein. In various embodiments, the delivery confirmation process may include various steps and/or actions by various devices. Accordingly, in various embodiments, the client device may also send a message to a server, a different client device, an A/V device, other device, or any combination thereof so that the delivery confirmation process can be executed at those other devices as well.

In some embodiments, the user may not indicate through the user interface of the client device that a package is being delivered. Instead, a different method of indicating a package is being delivered may be used. For example, the delivery person may indicate through an interface of the A/V device that a package is being delivered (e.g., button press, voice command, etc.). For example, the package may be equipped with an RFID chip that can be read by components of the A/V device (e.g., a sine wave generator and RF backscatter receiver and/or other componentry). The A/V device may determine from communicating with such an RFID chip that a package is being delivered. In such an example, the A/V device may send a message to a server, a client device, a different A/V device, other device, or any combination thereof to indicate that a package is being delivered. In this example, the delivery person may hold the package close to the A/V device so that the A/V device can communicate with/scan the RFID chip. Alternatively, it may be unnecessary for the delivery person to hold the package close to the A/V device, and the A/V device may be capable of detecting and receiving signals from the RFID chip before the delivery person 102 reaches the A/V device 110, as described above. For example, as the delivery person 102 approaches the A/V device 110, a motion sensor (e.g., a passive infrared sensor) and/or a camera of the A/V device 110 may detect motion. In response, the A/V device 110 may activate one or more components for detecting and receiving signals from the tag or chip on or within the package 104. For example, the package 104 may include a passive RFID tag, and the A/V device 110 may include a sine wave generator or other componentry for activating/exciting the passive RFID tag. The A/V device 110 may then receive a wireless signal from the passive RFID tag including a unique identifier associated with the package 104. The A/V device 110 may then transmit information received from the passive RFID tag, such as the unique identifier associated with the package 104, to the server 114, the network 116, and/or the delivery service server 122.

In another example, the delivery person and/or the user may indicate to the system that a package is being delivered using his or her voice. For example, the A/V device and/or the client device may capture audio that is analyzed (e.g., using speech-to-text analysis, using other audio analysis, etc.) to identify audio indicating that a package is being delivered. The audio may include spoken words clearly indicating that a package is being delivered (e.g., "I am here to deliver a package") or may include sounds/words that are a passcode known to the system to indicate that a package is being delivered, but not clearly indicating anything related to a package (e.g., "red herring fifty-two"). In another example, the delivery person may indicate that a package is being delivered through a user interface of a client device of the delivery person, such as the client device 108 of FIG. 1. In another example, computer vision or other object recognition processes as described herein may be performed on one or more images and/or video captured by the A/V device to recognize an indication that a package is being delivered. For example, the computer vision or object recognition process may identify a package, a delivery person, a badge worn by the delivery person, a logo or other marking on the delivery person's clothing, a vehicle of the delivery person, etc. Any of these identifiable aspects may be used to determine/deduce that a package is being delivered, and may be used for other purposes as well (e.g., security, identifying the delivery person, tracking timing/schedules/progress of deliveries or a delivery route, etc.).

At block B708, the A/V device scans a code on the package. In an embodiment, the code is a visual scannable code, such as a barcode, a QR code, a bokode, or a code made up of alphanumeric characters that can be read using optical character recognition (OCR). The code may also be a non-optical machine-readable code, such as a radio frequency identification (RFID) device or other electronically readable code that electronically encodes a unique identifier associated with the package. Other wireless communication methods may be used instead of or in addition to RFID to communicate an electronic code, such as Bluetooth Low Energy (BLE), Zigbee, Z-Wave, Wi-Fi, etc. In various embodiments, the A/V device may be instructed to scan the code in varying ways. For example, the A/V device may automatically determine using object recognition or other computer vision processes that an optical code is being presented. Once it is determined that the optical code is present, the A/V device may capture an image including the optical code, thereby scanning the optical code. In another example, the A/V device may be instructed to scan a code through an input or instruction. For example, the delivery person may push a button on the A/V device to trigger a scan of a code (e.g., capture an image of an optical code, communicate wirelessly to scan/get an electronic code, etc.). In another example, the user may make an input on their client device, which causes an instruction message to be sent to the A/V device to scan a code (e.g., capture an image of an optical code, communicate wirelessly to scan/get an electronic code, etc.). In another example, a voice command of the user and/or the delivery person may cause the A/V device to scan a code. In another example, a communication or instruction from a device associated with the delivery person may cause the A/V device to scan a code associated with a package.

At block B710, the code that is scanned from the package is sent from the A/V device to a server. The server may be a backend server 224 as described herein and/or the server 114 of FIG. 1. In various embodiments, a unique identifier may be determined from the code at the A/V device. For example, if the code is an optical machine-readable code such as a barcode or QR code, the code may be scanned and information encoded in the QR code (e.g., the unique identifier) is determined at the A/V device, which is then sent on to the server. In such an example, the A/V device may send only the unique identifier to the server instead of the scannable code itself. In some embodiments, the A/V device may not decode information like the unique identifier from the scannable code. Instead, the A/V device may capture an image of a scannable code and send the image of the code to the server for the server to decode the unique identifier from the scannable code. When the code is an electronically readable code, the code may include the unique identifier, so that the code sent to the server is the unique identifier.

At block B712, the server looks up information about the package using the code and sends the information to the client device. In various embodiments, the information may be stored on the server or may be stored at another location from which the server retrieves the information. In one example, a first server (e.g., the server 114 of FIG. 1) may send a message requesting the information to a second server (e.g., the delivery service server 122 of FIG. 1). The message requesting the information may include the unique identifier and/or code so that the second server can identify and transmit the correct information about the package back to the first server. Regardless how the information about the package is looked up, retrieved, etc., the information is sent to the client device once it is determined. In this way, the user can view the information about the package on a display of the client device and confirm that the details of the package, its delivery address, etc. are correct and that the user will accept and confirm delivery of the package.

In various embodiments where an electronically readable code is used, a scanning of the electronic code may serve as an indication that a package is being delivered (e.g., the scanning of the electronic code may indicate that a package is being delivered instead of a user indicating such through a user interface at block B706). In addition, electronic communications may be used to communicate additional information about the package other than the electronic code. In such an instance, portions of blocks B710 and/or B712 may be omitted, as the information about the package does not need to be looked up or obtained by the server and then sent to the client device. Instead, when the information is determined from electronic communications with a device on the package, the information about the package may therefore be sent from the A/V device to the client device, rather than the server having to send in the information about the package to the client device.

In various embodiments, the system may determine that a signature is required based on looking up and/or retrieving information about the package. For example, the server and/or delivery service server's information about a package may include data about whether a signature is required to deliver the package. Therefore, when the information about the package is looked up using a unique identifier of the package, the system can determine if a signature is required from the user to deliver the package and initiate the signature process with a message indicating signature is required to the A/V device, client device, and/or delivery person client device. In other various embodiments, the system may determine that a signature is required based on an input of the user and/or delivery person (e.g., user and/or delivery person makes an input via a user interface to a device indicating a signature is required such as a button press or voice command). In other various embodiments, a scanning of the code of the package may indicate that a signature is required. For example, when an electronic code is used, the communication of the electronic device (e.g., RFID chip) of the package may include information indicating that a signature is required. A format and/or part of a scanned code may indicate whether signature is required. For example, if a barcode represents a unique identifier made up of alphanumeric characters, a first or last character of the unique identifier may indicate that a signature is required, a length of the unique identifier may indicate that a signature is required, etc. In this way, the A/V device and/or the server may be able to determine that a signature is required based on the code and/or the unique identifier represented by the code. In various embodiments, the system may instead assume that a signature is required based on the initiation of the package delivery process (e.g., the system does not separately need to determine that a signature is required after the user, code, and/or delivery person indicates that a package is being delivered). In particular, the system may assume that a signature is required in various embodiments described herein because the delivery person is not likely to ring a doorbell when delivering a package unless a package needs to be signed for. That is, the delivery person may only ring a doorbell when a package needs to be signed for.

At block B714, the user electronically signs for the package through the user interface of the client device to indicate acceptance of delivery of the package. The electronic signature may be input to the client device through a touchscreen with the user's finger or a stylus, for example. In another example, an image of the user's signature already saved on the client device may be used as the electronic signature. In various embodiments, additional indications of acceptance may be used in addition to or instead of an electronic signature. For example, a biometric such as a finger print or facial recognition may be used to determine an identity of someone indicating acceptance of the package, and a record noting their identity may be created to indicate acceptance. In another example, a voice passcode may be used to authorize acceptance of delivery of the package. In another example, an alphanumeric code or password may be used to authorize acceptance of the package.

At block B716, the client device sends a message representative of the electronic signature (or other form of acceptance/confirmation of delivery) to the server. The message may include the electronic signature (or other form of acceptance/confirmation of delivery) or may merely indicate that the electronic signature (or other form of acceptance/confirmation of delivery) has been received. At block B718, the server, in response to receiving the electronic signature (or other form of acceptance/confirmation of delivery), sends an instruction to a device associated with the delivery person that the package may be left at the delivery address (e.g., building where the A/V device is installed) because delivery has been confirmed by the user. The device associated with the delivery person may be, for example, one of the client devices 214, 216 described herein and/or the client device 108 of FIG. 1. In various embodiments as described herein, the server may be multiple servers. For example, FIG. 1 shows two servers: the server 114 and the delivery service server 122. Accordingly, the server referenced in FIG. 7 may include both the server 114 and the delivery service server 122. In such embodiments, at blocks B716 and B718, a message representative of the electronic signature (or other form of acceptance/confirmation of delivery) may be sent to the server 114. The server 114 may then send a second message representative of the electronic signature (or other form of acceptance/confirmation of delivery) to the delivery service server 122. Once the delivery service server 122 receives the second message, the delivery service server 122 may send the instruction to the device associated with the delivery person that the package can be left/delivered.

In various embodiments, the instruction to instruct the delivery person to leave the package may be sent, at block B718, to the A/V device instead of a separate device associated with the delivery driver. In various embodiments, a client device associated with the delivery person may engage in the two-way communication with the client device of the user, thereby allowing for the omission of an A/V device. For example, a delivery person may be able to initiate a two-way communication and/or delivery confirmation process at a smartphone of the delivery person. The user may then communicate with the delivery person via their own client device (e.g., smartphone). In such embodiments, a phone number or other identification parameter of the user's client device may be known to the delivery service or otherwise associated with a user's address, online shopping account, etc. In this way, when the delivery person arrives to deliver a package, a two-way communication may be initiated between the client devices of both the delivery person and the user. In some embodiments, the client device of the delivery person may receive an input through a user interface from the delivery person to initiate the delivery confirmation process (e.g., an input indicating that a package is being delivered). In some embodiments, the client device of the delivery person may scan a code (optical and/or electronic) of a package to initiate the delivery confirmation process (e.g., an input indicating that a package is being delivered). In some embodiments, a scannable code (optical and/or electronic) may be present at the address where the package is to be delivered. In such embodiments, a client device of the delivery person may be used to scan the code to determine a unique identifier. That unique identifier may be associated with the user and/or the address instead of a package. The server may have stored thereon information about the user and/or address (e.g., a phone number of the user's client device) so that the server can facilitate initiating a two-way communication between the user and delivery person's client devices after the code is scanned at the location where the package is to be delivered.

In various embodiments, location determinations may be used to further determine proper delivery of a package has been made. For example, a location of a client device associated with the delivery person may be determined in order to compare the location to the address where the package is to be delivered. If the delivery person's client device is not in the correct location, the system may prevent a user from confirming/accepting delivery of the package.

In various embodiments, a user and their client device may be associated with A/V devices in multiple locations/addresses. Accordingly, the user may wish to verify that a package is at the correct location. The location of a delivery person's client device or the A/V device may be used to verify the delivery person's location. In some embodiments, the location or assigned name of the A/V device that the delivery person is at may also be sent to the user's client device so that the user may verify that the delivery person is at the correct location with the delivery.

In various embodiments, other verification of a package delivery may be done automatically to help ensure packages are properly delivered at the correct addresses. For example, the server may compare the details of a user's account (e.g., an online shopping account, security monitoring service account, etc.) with details relating to the A/V device, the delivery person's client device, and/or the address to which the package is to be shipped. For example, if the address/location of the A/V device and/or delivery person client device does not match the address to which the package is to be delivered and/or an address associated with a user of the client device, the system may prevent a user from confirming/accepting delivery of the package.

Figure 8:
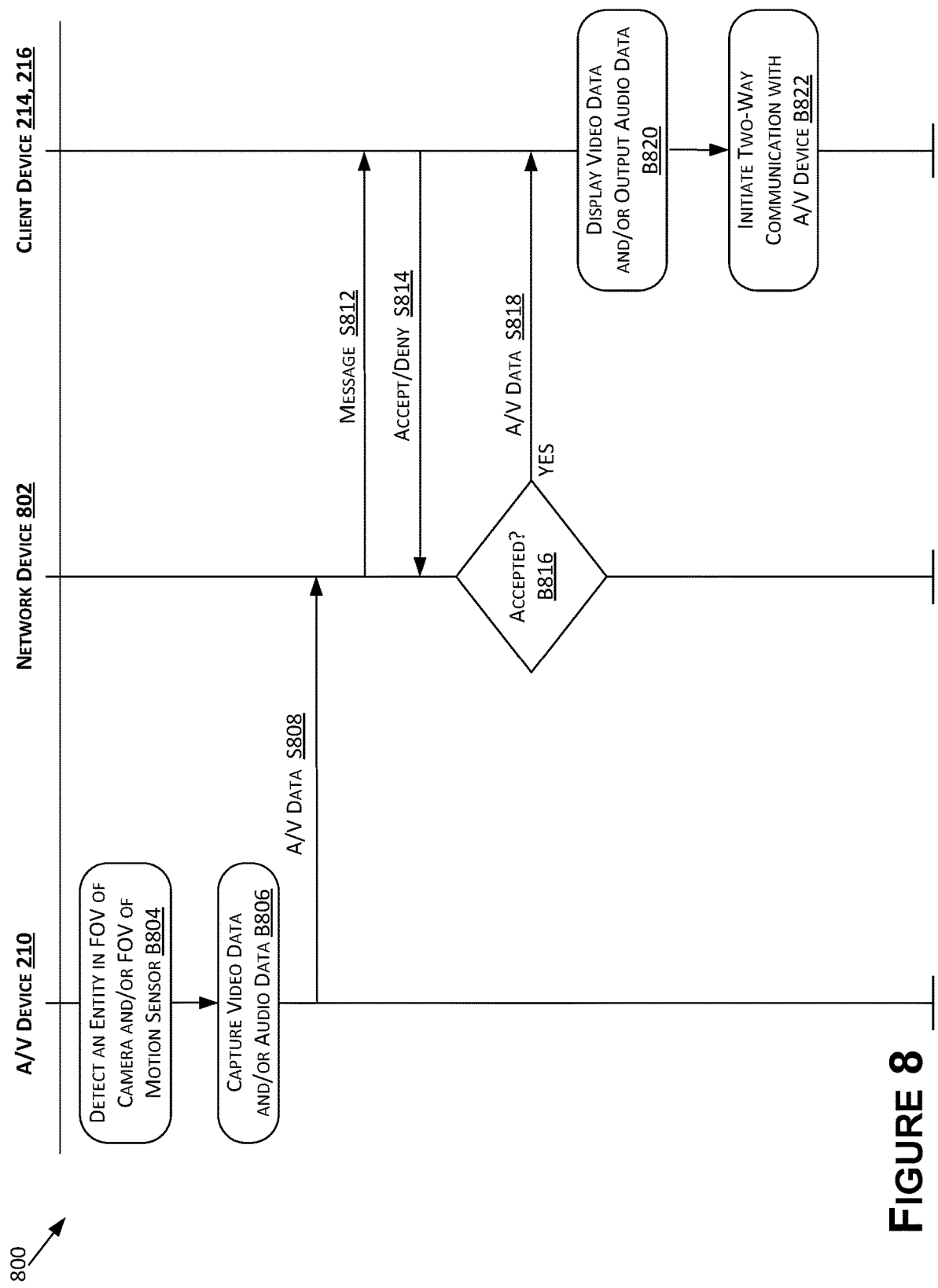
FIG. 8 is a signal diagram of a process for initiating a two-way communication between a client device and an A/V device according to various aspects of the present disclosure.

FIG. 8 is a signal diagram of a process 800 for initiating a two-way communication between the A/V device 210 and the client device 214, 216, according to various aspects of the present disclosure. The network device 802 may be the server 114 and/or the delivery service server 122, and may include one or more of the hub device 202, the VA device 208, and/or any of the components of the network(s) of servers/backend devices 220 (e.g., the backend server 224, the backend API 226, the storage devices 222, etc.). The A/V device 210 may be the video doorbell 110. The client device 214, 216 may be the client device 120.

At block B804, an object in a field of view of a camera and/or a field of view of a motion sensor is detected by the A/V device 210. For example, the A/V device 210 may detect the presence of an object (e.g., delivery person, package) within a field of view of view of the motion sensor(s) 326 (e.g., a motion sensor field of view) and/or a field of view of the camera 314 (e.g., a camera field of view). To detect motion using the motion sensor(s) 326, the data type (e.g., voltage for PIR sensors) from the output signal of the motion sensor(s) 326 may be analyzed, by the processor(s) 310 of the A/V device 210, to determine whether the output signal is indicative of motion of an object that should prompt the capturing and transmission of the image data 406 and/or audio data 408 at block B806 and signal S808 (e.g., initiate the two-way communication). To detect motion using the camera 314, the processor(s) 310 of the A/V device 210 may analyze the image data 406 by performing, for example, a frame by frame comparison of a change in pixels, to determine whether the image data 406 is indicative of motion of an object that should prompt the recording and transmission of image data 406 and/or audio data 408 at block B806 and signal S808. In some embodiments, the A/V device 210 may have a button (e.g., the button 306) by a delivery person that triggers the capturing and transmission of the image data 406 and/or the audio data 408 at block B806 and signal S808 (e.g., initiate the two-way communication). In other words, instead of the A/V device 210 detecting motion and/or objects to begin a two-way communication, the delivery person may press a button of the A/V device 210 to begin the two-way communication (including, e.g., a process for sending a request to initiate the two-way communication at the message S812).

At block B806, the A/V device 210 begins capturing video data and/or audio data. For example, the processor(s) 310 of the A/V device 210 may cause the camera 314 to begin generating the image data 406 and/or the microphone(s) 328 to being capturing the audio data 408. In some embodiments, the A/V device 210 may only begin capturing video data and/or audio data after the request for the two-way communication is accepted by the client device 214, 216 at signal S814.

At signal S808, the A/V device 210 transmits the video data and/or the audio data to the network device 802. For example, the processor(s) 310 of the A/V device 210, using the communication module 312, may transmit the image data 406 and/or the audio data 408 to the network device 802. In response, the network device 802 may receive, by respective processor(s) and using respective communication module(s), the image data 406 and/or the audio data 408. In some embodiments, the image data 406 and/or the audio data 408 is transmitted to the hub device 202 and/or the VA device 208, and the hub device 202 and/or the VA device 208 may transmit (or forward) the image data 406 and/or the audio data 408 to one or more components of the network(s) of servers/backend devices 220. In either embodiment, the network device 802 may transmit the image data 406 and/or the audio data 408 to a client device(s) 214, 216. In other embodiments, the image data 406 and/or the audio data 408 may be transmitted to the hub device 202 and/or the VA device 208, and the hub device 202 and/or the VA device 208 may transmit (or forward) the image data 406 and/or the audio data 408 to the client device(s) 214, 216. Still, in some embodiments, the image data 406 and/or the audio data 408 may be transmitted directly to the client device(s) 214, 216 from the A/V device 210.

In various embodiments, the network device 802 may store the video data and/or the audio data. For example, the network device 802 may store the image data 406 and/or the audio data 408. The image data 406 and/or the audio data 408 may be stored for future access by the user(s) of the A/V device 210 (e.g., as Cloud storage). In some embodiments, the A/V device 210 may store the image data 406 and/or the audio data 408 locally (e.g., in the memory 402). In some embodiments, the image data 406 and/or the audio data 408 may not be stored, except during buffering, compression, and/or live (or near-live) streaming of the image data 406 and/or the audio data 408 to the client device(s) 214, 216. In such embodiments, at the conclusion of a motion event (e.g., when an object is no longer in the camera field of view and/or the motion sensor field of view), the video data and/or the audio data may be deleted from the network device 802.

At signal S812, the network device 802 transmits a message to the client device. For example, the network device 802 may transmit, by the respective processor(s) and using the respective communication module(s), a message 416 to the client device(s) 214, 216. In some embodiments, the message 416 may be generated and transmitted, by the processor(s) 310 and using the communication module 312, directly to the client device(s) 214, 216 from the A/V device 210. The message 416 may be a notification (e.g., a push notification, a message, (e.g., a short-message-service (SMS) message), an email, a phone call, a signal, and/or another type of message. The message 416 may be configured to provide a user of the client device(s) 214, 216 with an indication that an object is present at the A/V device 210 and/or that the button 306 of the A/V device has been pressed. In some embodiments, the message 416 may be informative as to the type of motion detected and/or object present at the A/V device 210. For example, if a person (e.g., a delivery person), an animal, a parcel, or a vehicle is present, the message 416 may include an indication of such. As another example, if the person and/or animal detected are known to be dangerous and/or are acting suspicious (as determined using computer vision processing, image processing, behavioral analysis, third party source(s), etc.), the message 416 may include an indication of such. If the person is known to be a delivery person or it is known that a package is being delivered, the message 416 may include an indication of such.

At signal S814, the client device 214, 216 transmits an acceptance or denial of the message. For example, the client device(s) 214, 216 may transmit, by the processor(s) 702 and using the communication module 710, an acceptance or denial of the message 416. In various embodiments, acceptance of the message 416 includes an acknowledgement of receipt of the message 416 from the client device(s) 214, 216. In yet other embodiments, the acceptance includes the user interacting with (e.g., selecting through a user interface a user interface element of a modal window displayed by a display device the client device(s) 214, 216) the message 416. Furthermore, denial of the message 416 may include a variety of different actions and/or information. In one example, a denial includes a failure of the client device(s) 214, 216 to provide a response to the message 416 within an interval of time. In yet another example, the denial includes the user interacting with the message 416 by at least selecting an "ignore" user interface element of a GUI 718 of the client device(s) 214, 216. In this way, the user may be alerted to the presence of a delivery person and/or package to be delivered. In response, the hub device 202, the VA device 208, and/or one or more components of the network(s) of servers/backend devices 220 may receive, by the respective processors and using the respective communication modules, the acceptance or denial of the message 416 from the client device(s) 214, 216.

At block B816, the network device 802 determines whether the message was accepted or denied. For example, the network device 802 may determine, by the respective processors, whether the message 416 was accepted or denied. In some embodiments, the processor(s) 310 of the A/V device 210, using the communication module 312, may determine whether the message 416 was accepted or denied (e.g., in embodiments where the A/V device 210 and the client device(s) 214, 216 communicate directly). When the message 416 is denied, the process 800 may end, or another transmission type of the message may be generated (e.g., if a user denies a push notification, an SMS message may be transmitted). When the message 416 is accepted, the image data 406 and/or the audio data 408 may be transmitted to the client device(s) 214, 216 that accepted the message 416.

At signal S818, the network device 802 transmits the video data and/or the audio data to the client device(s) 214, 216. For example, network device 802, by the respective processor(s) and using the respective communication module(s), may transmit the image data 406 and/or the audio data 408 to the client device(s) 214, 216. In response, the client device(s) 214, 216, by the processor(s) 702 and using the communication module 710, may receive the image data 406 and/or the audio data 408. In some embodiments, the image data 406 and/or the audio data 408 may be transmitted by the processor(s) 310 of the A/V device 210, using the communication module 312, directly to the client device(s) 214, 216.

At block B820, the client device 214, 216 displays the video data and/or outputs the audio data. For example, the processor(s) of the client device(s) 214, 216 may cause display, on the display 716 of the client device(s) 214, 216, the image data 406 and/or may cause output, by the speaker(s) 708 of the client device(s) 214, 216, the audio data 408. In addition to displaying the image data 406 and/or outputting the audio data 408, a GUI 718 may be displayed on the client device(s) 214, 216 that may allow a user of the client device(s) 214, 216 to perform one more actions. The one or more actions may include outputting a siren, or alarm, by selecting a siren/alarm icon, changing camera settings (e.g., pan, tilt, zoom, brightness, contrast, etc.) by selecting one or more camera settings icons, activating one or more modes by selecting a mode activation icon (e.g., for activating a parcel protection mode for monitoring a package in the camera field of view), arming or disarming a security system by selecting an arm/disarm icon, unlocking a door by selecting a door lock icon, beginning a delivery confirmation process, etc. In various embodiments as described herein, the GUI 718 may further include a talk icon for initiating a two-way communication session between the client device(s) 214, 216 and the A/V device 210, as described below with respect to block B822.

At the block B822, the client device 214, 216 initiates a two-way communication with the A/V device. For example, the processor(s) 702 of the client device(s) 214, 216, using the communication module 710, may initiate a two-way communication session with the A/V device 210. In response, the A/V device 210 and/or the network device 802 may receive the two-way communication request from the client device(s) 214, 216. Once the two-way communication session is established, the voice/sound input at the client device(s) 214, 216, as captured by the microphone(s) 706 of the client device(s) 214, 216, may be transmitted as audio data to the A/V device 210 for output by the speaker(s) 330. Additionally, the voice/sound input at the A/V device 210, as captured by the microphone(s) 328 of the A/V device 210, may be transmitted as audio data 408 to the client device 214, 216 for output by the speaker(s) 708 of the client device(s) 214, 216.

Figure 9:
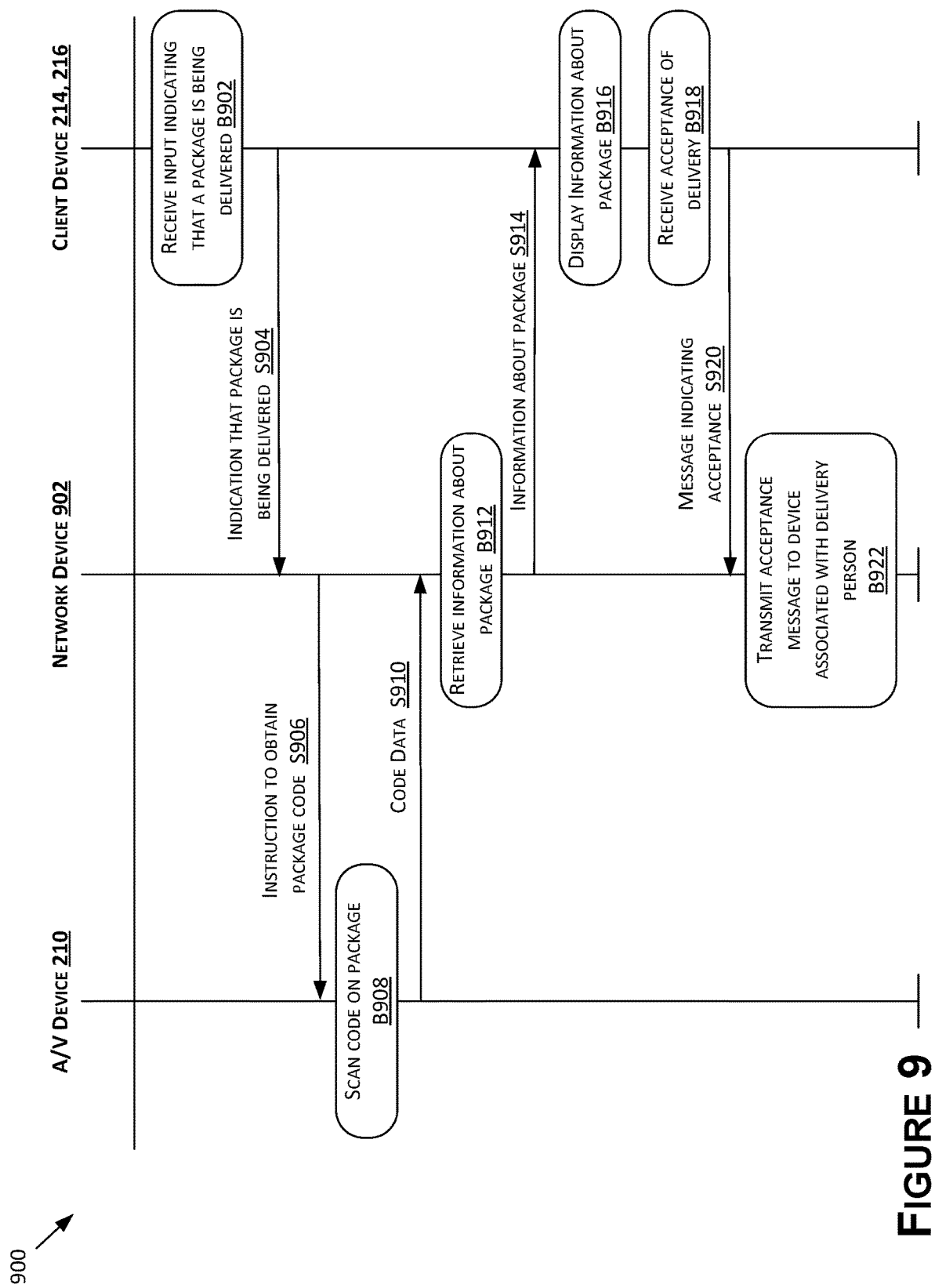
FIG. 9 is a signal diagram of a process for confirming package delivery according to various aspects of the present disclosure.

FIG. 9 is a signal diagram of a process 900 for confirming package delivery according, according to various aspects of the present disclosure. The network device 902 may be the server 114 and/or the delivery service server 122, and may include one or more of the hub device 202, the VA device 208, and/or any of the components of the network(s) of servers/backend devices 220 (e.g., the backend server 224, the backend API 226, the storage devices 222, etc.). The A/V device 210 may be the video doorbell 110. The client device 214, 216 may be the client device 120. The process 900 occurs after a two-way communication has begun between the A/V device 210 and the client device 214, 216. However, in various embodiments, some or all of the process 900 may occur prior to the two-way communication being initiated.

At block B902, the client device 214, 216 receives an input indicating that a package is being delivered. As described herein, this may occur in various ways, for example through a input on a touchscreen, a button press, a voice command, etc. Regardless of how the input is made, the user indicates that a package is being delivered. The user may determine that a package is being delivered based on an image received from the A/V device 210 showing the delivery person and/or the package to be delivered. The user may also determine that a package is being delivered based on audio from the A/V device 210, where the delivery driver informs the user that the delivery person is delivering a package.

In various embodiments as described herein, the delivery confirmation process may begin in other ways. For example, instead of an input indicating that a package is being delivered being received at the client device 214, 216 from the user, an input may be received at the A/V device 210 that indicates a package is being delivered. As some examples: a code on a package may be scanned by the A/V device 210 that indicates a package is being delivered; an input may be made by the delivery person into the A/V device 210 to indicate a package is being delivered (e.g., button press, voice command, etc.); the A/V device 210 may communicate with a client device of the delivery person to determine that a package is being delivered; the A/V device 210 may determine using computer vision and/or object recognition to automatically determine that a package is being delivered based on recognizing a package, a label of a package, a delivery person (or aspect of the delivery person, what the delivery person is wearing, a badge, etc.), a delivery vehicle, or some combination thereof; a determination that a package and/or client device of the delivery person is at a location where the package is to be delivered; or any combination thereof. In such embodiments where the client device 214, 216 does not receive the input indicating that a package is being delivered, one or both of the signals S904 and S906 may be omitted from the process 900.

After receiving the input indicating that a package is being delivered at block B902, the client device 214, 216 transmits a message indicating that a package is being delivered to the network device 902 at a signal S904. The network device 902 then sends a message instructing the A/V device 210 to obtain a code associated with the package at a signal S906. As described herein, the code may be an optical and/or electronically readable code that encodes a unique identifier associated with the package.

At block B908, the A/V device 210 scans the code on and/or associated with the package (e.g., capturing an image of an optical code, communicating with an electronic device such as an RFID chip affixed to or in the package, etc.). As described herein, the A/V device 210 may determine the unique identifier from the scanning of the code, or may send the code to the network device 902 so that the network device 902 can determine the unique identifier associated with the package. In any case, the code data is sent to the network device 902 as signal S910.

At block B912, the network device 902 retrieves information about the package. As described herein, that information may be stored on a server, including on a server associated with a delivery service (e.g., the delivery service server 122 of FIG. 1). Accordingly, the retrieving at block B912 may include one server communicating with one or more other servers to retrieve the information about the package. Regardless of how the network device 902 retrieves the information and what devices/servers are involved, the network device 902 transmits the information about the package to the client device 214, 216 as signal S914.

At block B916, the client device 214, 216 displays the information about the package. For example, the client device 214, 216 may display the information on a touchscreen of a smartphone. In some embodiments, the client device 214, 216 may, instead of or in addition to displaying the information, output information about the package as audio from a speaker so that the user may hear information about the package.

At block B918, the client device 214, 216 receives an input indicating acceptance/confirmation of delivery of the package. For example, the user may press a button on a touchscreen display of the client device 214, 216 or give a voice command and/or passcode to authorize delivery of the package. In another example, the user may input an electronic signature into an interface such as a touchscreen to confirm/accept delivery of the package. As described herein, location information of the A/V device 210, the package, and/or a client device of the delivery person may also be used to confirm delivery is correct. For example, if the location of the A/V device 210 is not associated with the address where the package is to be delivered, the system may prevent a user from confirming/accepting delivery of the package.

Once the input indicating acceptance/confirmation of delivery is received at block B918, a message indicating that acceptance is transmitted to the network device 902 as a signal S920. The message may include data relating to the acceptance/confirmation, such as a time, date, current location of the client device 214, 216, electronic signature, type of acceptance/confirmation input, passcode information used to authorize delivery (e.g., alphanumeric, voice, etc.), information related to person who accepted/confirmed delivery (e.g., name, job title, etc.), or any combination thereof.

At block B922, the network device 902 transmits an acceptance message to a device associated with a delivery person. In this way, the delivery person can be instructed to leave/deliver the package. In various embodiments, the acceptance message may be sent from a server to a delivery service server and then to the device associated with the delivery person. In other embodiments, the acceptance message may be sent directly from a server to the device associated with the delivery person (e.g., the server and the delivery service server are not distinct servers). In various embodiments, an acceptance message may be sent to the A/V device 210 instead of or in addition to the device associated with the delivery person. In this way, the A/V device 210 may display or output a message (e.g., through a speaker) indicating that the package may be left/delivered, as delivery has been confirmed/accepted by the user.

Figure 10A:
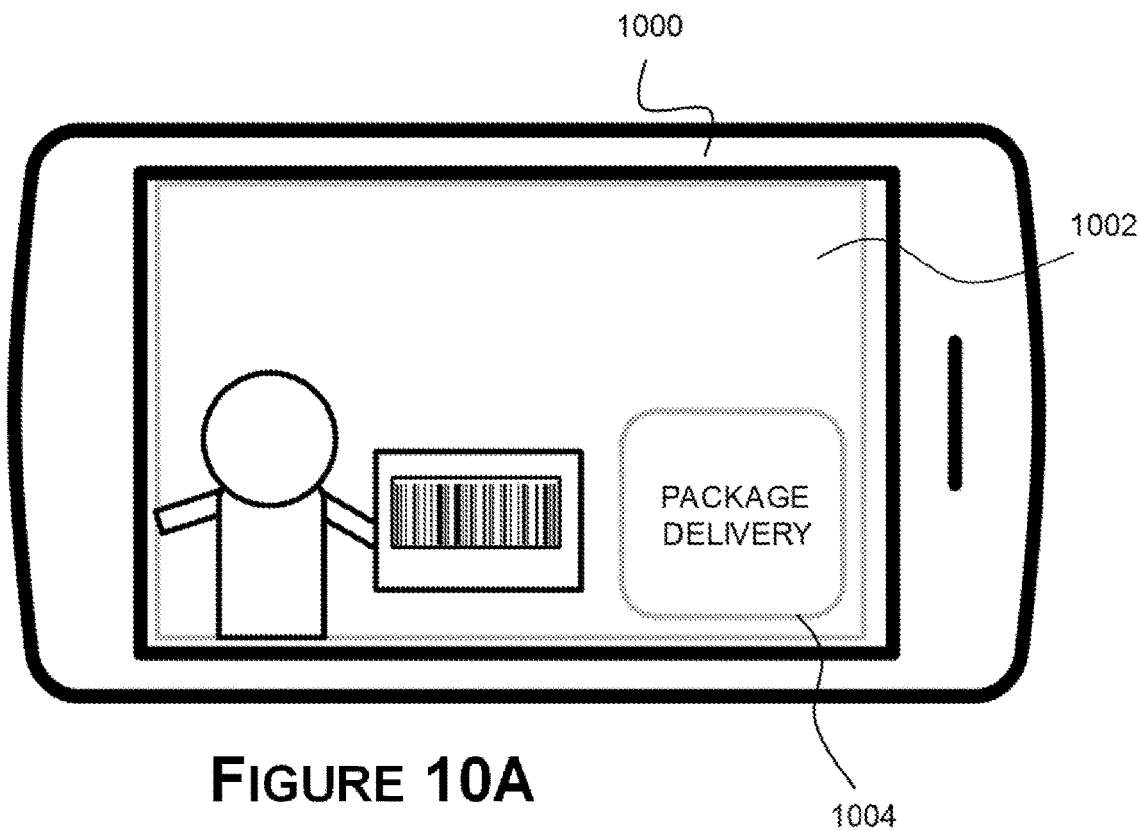
FIGS. 10A-10C are example user interfaces displayed on a client device for confirming package delivery according to various aspects of the present disclosure.
Figure 10B:
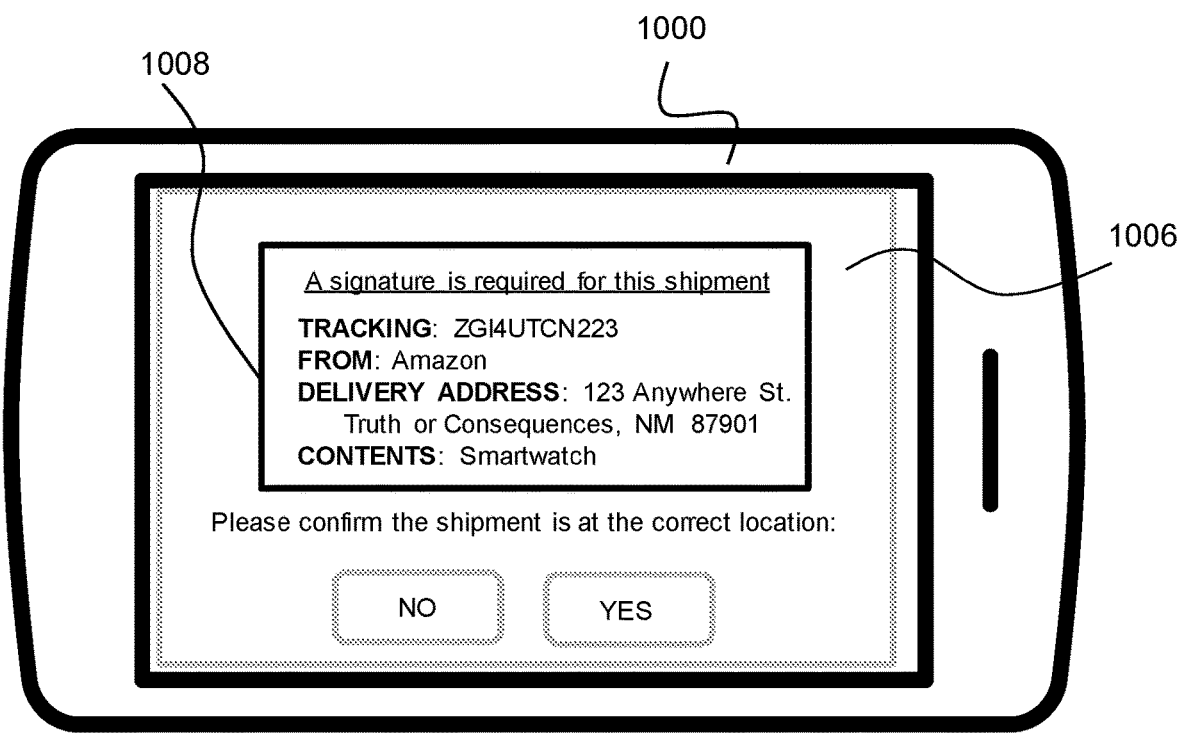
Figure 10C:
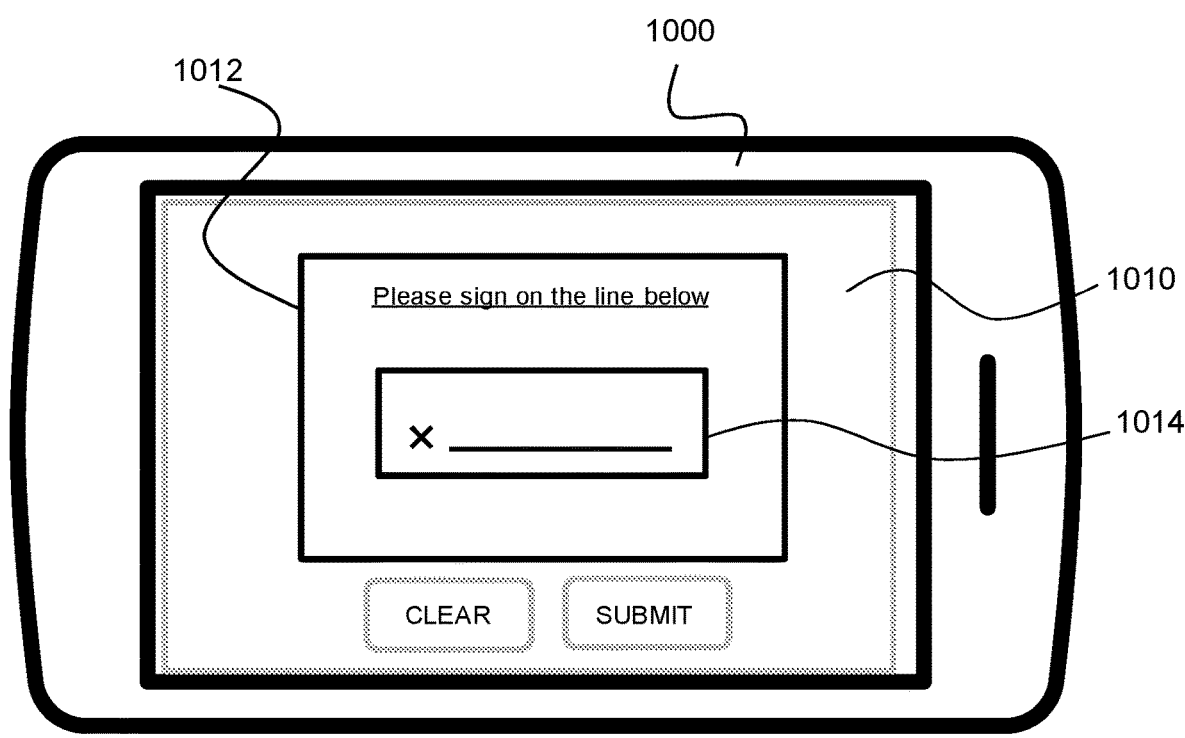

FIGS. 10A-10C are example user interfaces displayed on a client device for confirming package delivery according to various aspects of the present disclosure. The user interfaces of FIGS. 10A-10C may be displayed, for example, on a touchscreen of a client device 1000 such as the client device(s) 214, 216 described herein. A specific example of such a client device is shown as the client device 120 of FIG. 1. The touchscreen interface of a display of the client device 1000 allows particular parts of the display to be interacted with by the user (e.g., to provide inputs indicating various aspects of the systems and processes described herein).

FIG. 10A shows an example user interface 1002 displayed during a two-way communication between the client device 1000 and the A/V device according to various aspects of the present disclosure. The user interface 1002 includes an image of a delivery person holding a package with a barcode, such as the delivery person 102 holding the package 104 with the barcode 106 of FIG. 1. The image is based on image data received from the A/V device that captures the delivery person and the package. The user interface 1002 also includes a package delivery button 1004. The user may select/press the package delivery button 1004 as an input indicating that a package is being delivered, according to various embodiments described herein. The user may determine, for example, that a package is being delivered based on seeing a package on the user interface 1002.

In various embodiments, the user interface 1002 may include less information, interactable buttons, etc. For example, if an input indicating that a package is being delivered is not received at the client device 1000 (e.g., in embodiments where the A/V device determines that a package is being delivered based on scanning a code of a package, communications with a delivery person client device, inputs from a delivery person, etc.), the package delivery button 1004 may not be displayed on the user interface 1002.

In various embodiments, the user interface 1002 may include more information, interactable buttons, etc. For example, the user interface 1002 may include information about the location or other information that helps a user identify which A/V device the client device 1000 is communicating with. This information may be particularly helpful where a client device 1000 is connectable to multiple A/V devices, so that the user may determine with which of the user's A/V devices the user is currently communicating. In some embodiments, this information may be displayed on other user interfaces (e.g., the user interfaces of FIG. 10B and/or FIG. 10C) in addition to or instead of on the user interface 1002. In another example, the user interface 1002 (or another user interface) may display information relating to a delivery person and/or delivery service that the user is communicating with via the client device 1000.

In various embodiments, additional interactable buttons may be included on the user interface 1002. For example, a button may be included that allows the user to capture and save an image displayed on the user interface 1002. This information may be used, for example, to capture the barcode on the package and send the image and/or a unique identifier determined from the image to a server. In other embodiments, the A/V device may recognize automatically that an optically scannable code is in the field of view and capture the image.

FIG. 10B shows an example user interface 1006 displayed during a two-way communication between the client device 1000 and the A/V device according to various aspects of the present disclosure. The user interface 1006 shows information 1008 about the package being delivered. The information 1008 in this example includes a tracking number, a sender of the package, a delivery address for the package, and a description of the contents of the package. The user interface 1006 also includes interactable "NO" and "YES" buttons so that a user can indicate whether the user would like to accept/confirm delivery of the package or not.

FIG. 10C shows an example user interface 1010 displayed during a two-way communication between the client device 1000 and the A/V device according to various aspects of the present disclosure. The user interface 1010 displays a dialog box 1012 that includes an interactable electronic signature box 1014. The user may move their finger, for example, within the electronic signature box 1014 to input a signature to confirm/accept delivery of a package. As described herein, other methods of accepting/confirming delivery of a package may be used instead of or in addition to an electronic signature. The user interface 1010 also includes a "CLEAR" button and a "SUBMIT" button. The "CLEAR" button may be pressed by the user to clear an electronic signature already input so that the user may redo the signature. The "SUBMIT" button may be pressed to send a message representative of and/or including the electronic signature to a server and/or A/V device. Although not shown in the example of the user interface 1010, in various embodiments the user interface 1010 may include a "BACK" button to return the user to the user interface 1002 or the user interface 1006 if the user decides not to enter an electronic signature.

In various embodiments, the two-way communication may continue during some or all of the time while the user interfaces 1002, 1006, and/or 1010 are being displayed and/or interacted with by the user. Accordingly, the user and the delivery person may be able to, for example, talk to one another while the user confirms the delivery details according to the user interface 1006 and/or confirms/accepts delivery of the package in the user interface 1010.

Accordingly, referencing FIG. 1, the various embodiments described herein relate to confirming delivery of the package 106 remotely. When the package delivery person 102 approaches the video doorbell 110, the delivery person 102 can press a button on the video doorbell 110 or the video doorbell 110 may detect the motion of the delivery person 102. This can initiate an alert to the client device 120 associated with the video doorbell 110, so that the user 118 of the client device 120 can accept a two-way communication with the video doorbell 110. The user 118 may make an input into the client device 120 indicating that the package 106 is being delivered, or the video doorbell 110 and/or the delivery person client device 108 may be used to determine that the package 106 is being delivered. For example, once the two-way communication begins, the delivery person 102 may communicate that the delivery person 102 is there to deliver the package 106, and the user 118 of the client device 120 may initiate a process on the client device 120 to accept/confirm delivery of the package 106 and sign for (confirm/accept) the package 106 remotely. In another example, an input into the video doorbell 110, a code scanned by the video doorbell 110, and/or a communication of the video doorbell 110 with another device (e.g., RFID chip of the package 106, delivery person client device 108, etc.) may indicate that the package 106 is being delivered and cause the process to accept/confirm delivery of the package 106 to be initiated. The delivery person 102 may also present the package 106 to be scanned (e.g., a barcode) by the video doorbell 110. This scan may be sent to the server 114, which can communicate with the delivery service server 122 to determine information about the package 106. This information can be sent to the client device 120, and a dialog on the client device 120 allows the user 118 to sign to confirm/accept delivery of the package 106. A message representative of the signature may be sent to the delivery service server 122 to confirm delivery of the package 106. The user 118 may also instruct the delivery person 102 where to leave the package 106 during the two-way communication. In this way, the user 118 can remotely confirm delivery of (e.g., sign for) the package 106 without actually being present to receive the package 106.

Figure 11:
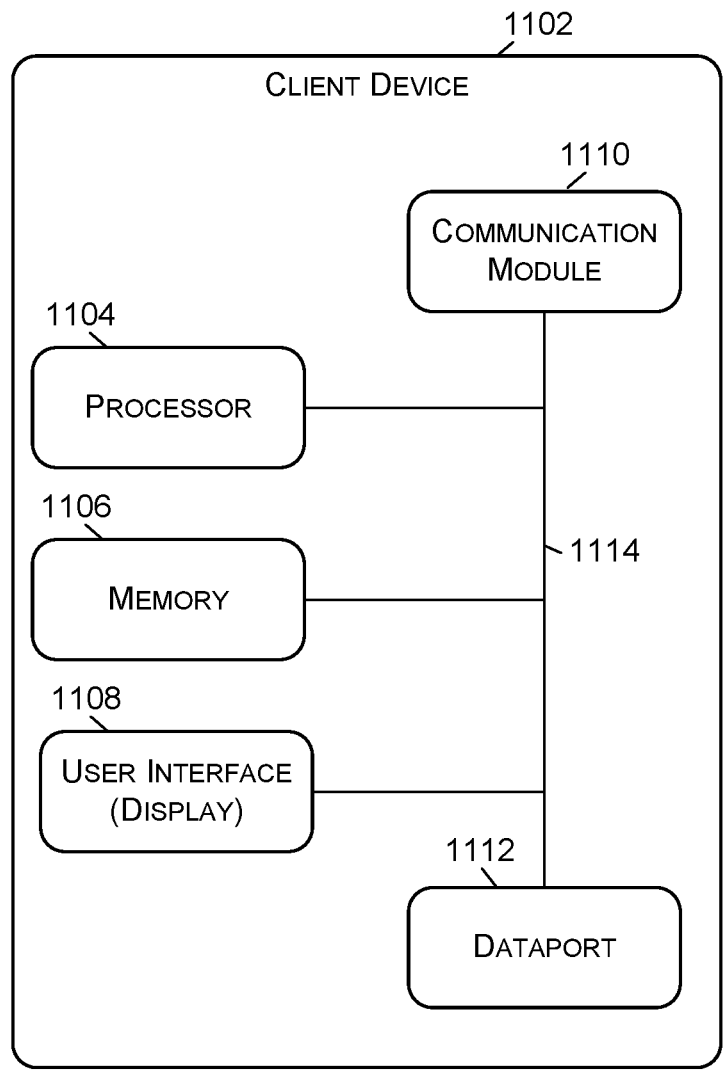
FIG. 11 is a functional block diagram of a client device on which the present embodiments may be implemented according to various aspects of the present disclosure.

FIG. 11 is a functional block diagram of a client device 1102 on which the present embodiments may be implemented according to various aspects of the present disclosure. The client device(s) 214, 216 described with reference to FIG. 2 may include some or all of the components and/or functionality of the client device 1102. The client device 1102 may comprise, for example, a smartphone.

With reference to FIG. 11, the client device 1102 includes a processor 1104, a memory 1106, a user interface 1108, a communication module 1110, and a dataport 1112. These components are communicatively coupled together by an interconnect bus 1114. The processor 1104 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1106 may include both operating memory, such as random-access memory (RAM), as well as data storage, such as read-only memory (ROM), hard drives, flash memory, or any other suitable memory/storage element. The memory 1106 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1104 and the memory 1106 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1104 may be connected to the memory 1106 via the dataport 1112.

The user interface 1108 may include any user interface or presentation elements suitable for a smartphone and/or a portable computing device, such as a keypad, a display screen, a touchscreen, a microphone, and a speaker. The communication module 1110 is configured to handle communication links between the client device 1102 and other, external devices or receivers, and to route incoming/outgoing data appropriately. For example, inbound data from the dataport 1112 may be routed through the communication module 1110 before being directed to the processor 1104, and outbound data from the processor 1104 may be routed through the communication module 1110 before being directed to the dataport 1112. The communication module 1110 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1112 may be any type of connector used for physically interfacing with a smartphone and/or a portable computing device, such as a mini-USB port or an IPHONE®/IPOD® 30-pin connector or LIGHTNING® connector. In other embodiments, the dataport 1112 may include multiple communication channels for simultaneous communication with, for example, other processors, servers, and/or client terminals.

The memory 1106 may store instructions for communicating with other systems, such as a computer. The memory 1106 may store, for example, a program (e.g., computer program code) adapted to direct the processor 1104 in accordance with the present embodiments. The instructions also may include program elements, such as an operating system. While execution of sequences of instructions in the program causes the processor 1104 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 12:
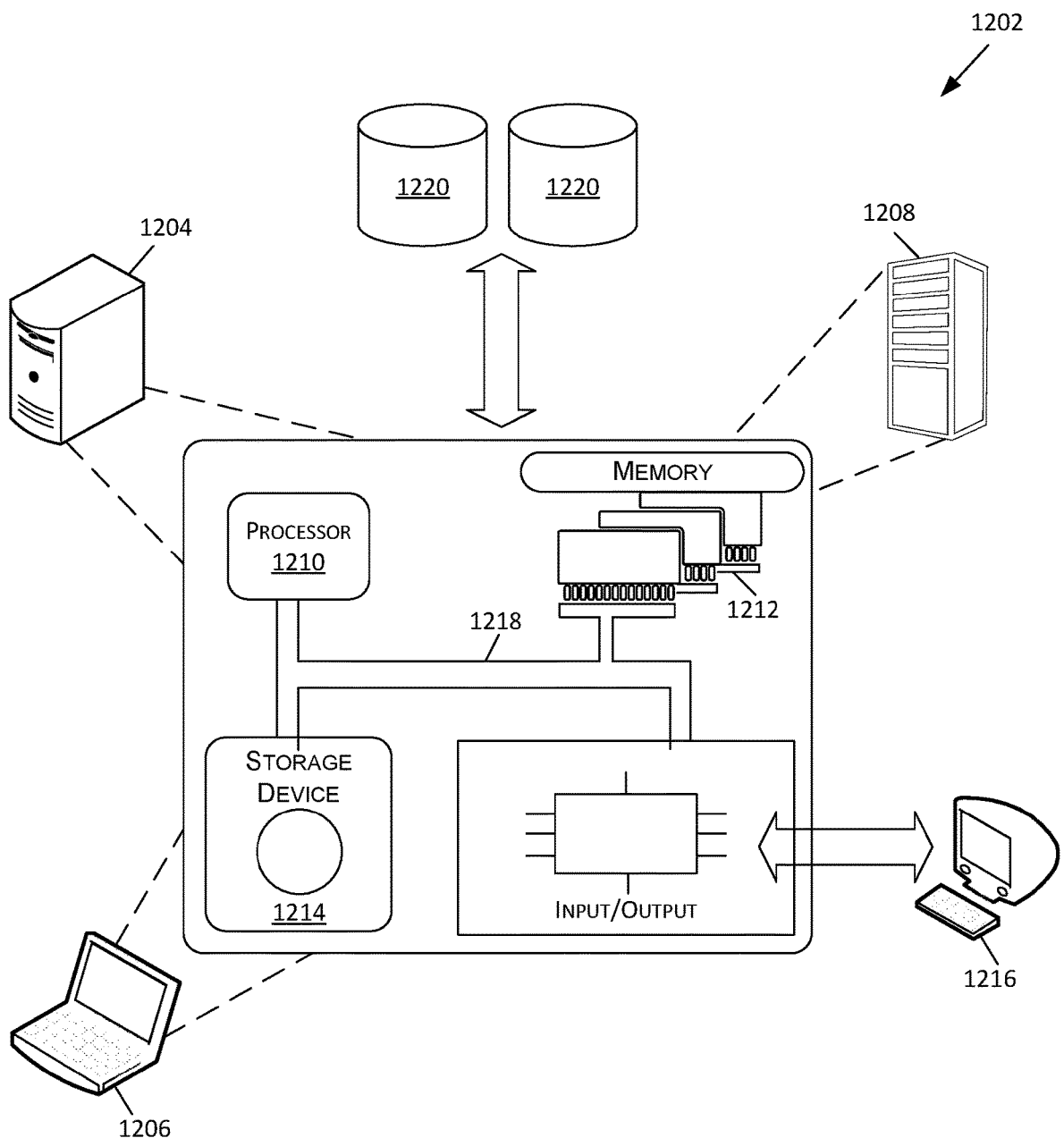
FIG. 12 is a functional block diagram of a general-purpose computing system on which the present embodiments may be implemented according to various aspects of present disclosure.

FIG. 12 is a functional block diagram of a general-purpose computing system on which the present embodiments may be implemented according to various aspects of the present disclosure. The computer system 1202 may be embodied in at least one of a personal computer (also referred to as a desktop computer) 1204, a portable computer (also referred to as a laptop or notebook computer) 1206, and/or a server 1208 is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1202 may execute at least some of the operations described above. The computer system 2102 may include at least one processor 1210, memory 1212, at least one storage device 1214, and input/output (I/O) devices 1216. Some or all of the components 1210, 12 12, 1214, 1216 may be interconnected via a system bus 1218. The processor 1210 may be single- or multi-threaded and may have one or more cores. The processor 1210 execute instructions, such as those stored in the memory 1212 and/or in the storage device 1214. Information may be received and output using one or more I/O devices 1216.

The memory 1212 may store information, and may be a computer-readable medium, such as volatile or non-volatile memory. The storage device(s) 1214 may provide storage for the system 2102 and, in some embodiments, may be a computer-readable medium. In various aspects, the storage device(s) 1214 may be a flash memory device, a hard disk device, an optical disk device, a tape device, or any other type of storage device.

The I/O devices 1216 may provide input/output operations for the system 1202. The I/O devices 1216 may include a keyboard, a pointing device, and/or a microphone. The I/O devices 1216 may further include a display unit for displaying graphical user interfaces, a speaker, and/or a printer. External data may be stored in one or more accessible external databases 1220.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which the person pertains to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in some embodiments be performed concurrently. Likewise, steps that have been presented as being performed concurrently may in some embodiments be performed separately.

What is claimed is:

1. A non-transitory computer readable medium having instructions stored thereon that, upon execution by a client device, cause the client device to perform operations comprising:
receiving, at the client device, a signal indicative of a request to begin a two-way audio communication between the client device and a network-connectable audio/video recording and communication device ("A/V device");
receiving, via a user interface of the client device, a first input indicating an acceptance of the request to begin the two-way audio communication;
receiving, via the user interface during the two-way audio communication, a second input indicating that a package is being delivered to a building associated with the A/V device;
based on the receiving of the second input indicating that the package is being delivered, initiating a delivery confirmation process at the client device, wherein the delivery confirmation process comprises:
receiving, at the client device, information about the package comprising at least one of a description of contents of the package, an identity of a sender of the package, a tracking number associated with the package, or a delivery address of the package;
displaying, on a display of the client device, the information about the package;
receiving, via the user interface, an electronic signature indicating acceptance of delivery of the package; and
transmitting, by the client device, data representative of the electronic signature to a delivery service server.

2. The non-transitory computer readable medium of claim 1, wherein the operations further comprise:
receiving, at the client device, first audio data and video data from the A/V device;
capturing, by a microphone of the client device, second audio; and
transmitting, from the client device, second audio data representative of the second audio to the A/V device.

3. The non-transitory computer readable medium of claim 2, wherein the video data received at the client device is representative of at least one image of the package being delivered.

4. The non-transitory computer readable medium of claim 2, wherein the second audio data transmitted to the A/V device is representative of an audio message instructing a delivery person where to place the package being delivered.

5. A method comprising:
receiving, at a first network-connectable electronic device from a second network-connectable electronic device:
first audio data representative of first audio captured at the second network-connectable electronic device, and
video data representative of at least one image captured by a camera of the second network-connectable electronic device;
transmitting, from the first network-connectable electronic device to the second network-connectable electronic device, second audio data representative of second audio captured at the first network-connectable electronic device, wherein the receiving of the first audio data and the transmitting of the second audio data comprises a two-way audio communication between the first network-connectable electronic device and a second network-connectable electronic device;

displaying, on a display of the first network-connectable electronic device, the video data received from the second network-connectable device along with a display element for indicating that a package is being delivered, wherein the video data and the display element are displayed together on the display at a same time;

receiving, via a user interface of the first network-connectable electronic device, a signal indicating that a package is being delivered based on a selection of the display element via the user interface;

based on the receiving of the signal indicating that the package is being delivered based on the selection of the display element at the first network-connectable device, initiating a delivery confirmation process at the first network-connectable device, wherein the delivery confirmation process comprises:
 receiving, via the user interface, an input indicating acceptance of delivery of the package, wherein the input is received during the two-way audio communication between the first network-connectable electronic device and the second network-connectable electronic device; and
 transmitting, by the first network-connectable electronic device, a message indicating the acceptance of delivery of the package to a server.

6. The method of claim 5, wherein the video data received at the first network-connectable device is representative of at least one image of the package being delivered.

7. The method of claim 5, wherein the second audio data transmitted to the second network-connectable device is representative of an audio message instructing a delivery person where to place the package being delivered.

8. The method of claim 5, wherein the input is a first input and the method further comprises:
 receiving, at the first network-connectable electronic device, a request to initiate the two-way communication; and
 receiving, via the user interface, a second input indicating an acceptance of the request to initiate the two-way communication.

9. The method of claim 8, further comprising displaying, on the user interface of the first network connectable device, a display element representative of the request to initiate the two-way communication.

10. The method of claim 8, wherein the request to initiate the two-way communication is received from the second network-connectable electronic device.

11. The method of claim 5, further comprising, during the two-way communication, receiving, at the first network-connectable device, information about the package, wherein the information comprises at least one of a description of contents of the package, an identity of a sender of the package, a tracking number associated with the package, a delivery address of the package, or an identity of a delivery service delivering the package.

12. The method of claim 5, wherein the first network-connectable electronic device and the second network-connectable electronic device are physically remote from one another.

13. The method of claim 5, wherein the input indicating acceptance of delivery of the package comprises at least one of an electronic signature, a verbal passcode, or a press of a button.

14. The method of claim 5, wherein the display and the user interface of the first network-connectable electronic device comprises a touchscreen.

15. The method of claim 14, wherein the signal indicating that the package is being delivered is received in response to a touching of the touchscreen in an area where the display element is displayed.

16. The method of claim 5, wherein the first network-connectable electronic device comprises at least one of a laptop, a tablet, a smartphone, or a virtual assistant device; and the second network-connectable electronic device comprises at least one of a smartphone, a laptop, a tablet, or an audio/video recording and communication device.

17. The method of claim 5, wherein the signal indicating that the package is being delivered is not an unlock door signal, and further wherein the method comprises transmitting, by the first network-connectable electronic device, the signal indicating that the package is being delivered to at least one of the server, the second network-connectable electronic device, or a third network-connectable electronic device.

18. A method comprising:
 connecting a two-way audio communication between a first network-connectable electronic device and a second network-connectable electronic device;
 receiving during the two-way audio communication, from the first network-connectable electronic device, data indicating that a package is being delivered;
 based on the receiving of the data from the first network-connectable electronic device indicating that the package is being delivered, initiating a delivery confirmation process comprising:
  transmitting an instruction to the second network-connectable electronic device to obtain a unique identifier associated with the package;
  receiving, from the second network-connectable electronic device, the unique identifier of the package;
  transmitting, to a delivery service server, the unique identifier;
  receiving, from the delivery service server, information about the package comprising at least one of a description of contents of the package, an identity of a sender of the package, a tracking number associated with the package, or a delivery address of the package;
  transmitting, to the first network-connectable electronic device, the information about the package;
  receiving, from the first network-connectable electronic device, a first message indicating acceptance of delivery of the package; and
  transmitting, to the delivery service server, a second message indicating the acceptance of delivery of the package.

19. The method of claim 18, wherein each of the first message and the second message comprises information representative of the acceptance of the delivery of the package.

20. The method of claim 19, wherein the information representative of the acceptance of the delivery of the package comprises an electronic signature.

21. The method of claim 18, further comprising receiving, from the first network-connectable electronic device, a confirmation message indicating that the delivery address of the package is correct.

* * * * *